United States Patent
Lin et al.

(10) Patent No.: US 11,231,544 B2
(45) Date of Patent: Jan. 25, 2022

(54) METASURFACES FOR REDIRECTING LIGHT AND METHODS FOR FABRICATING

(71) Applicant: Magic Leap, Inc., Dania Beach, FL (US)

(72) Inventors: Dianmin Lin, Los Altos, CA (US); Mauro Melli, San Leandro, CA (US); Pierre St. Hilaire, Belmont, CA (US); Christophe Peroz, San Francisco, CA (US); Evgeni Poliakov, San Mateo, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/342,033

(22) Filed: Nov. 2, 2016

(65) Prior Publication Data
US 2017/0131460 A1    May 11, 2017

Related U.S. Application Data

(60) Provisional application No. 62/252,929, filed on Nov. 9, 2015, provisional application No. 62/252,315, filed on Nov. 6, 2015.

(51) Int. Cl.
*F21V 8/00* (2006.01)
*G02B 6/00* (2006.01)
(Continued)

(52) U.S. Cl.
CPC ............. *G02B 6/0076* (2013.01); *G02B 6/00* (2013.01); *G02B 6/005* (2013.01); *G02B 6/0013* (2013.01);
(Continued)

(58) Field of Classification Search
CPC ...... G02B 6/00; G02B 6/0013; G02B 6/0015; G02B 6/0016; G02B 6/0026;
(Continued)

(56) References Cited

U.S. PATENT DOCUMENTS

| 6,850,221 | B1 | 2/2005 | Tickle |
| D514,570 | S | 2/2006 | Ohta |

(Continued)

FOREIGN PATENT DOCUMENTS

| CN | 101556356 | 10/2009 |
| CN | 102112898 A | 6/2011 |

(Continued)

OTHER PUBLICATIONS

Schowengerdt et al., "Volumetric Display using Scanned Fiber Array", in Journal of SID Symposium Digest of Technical Papers, vol. 41, Issue 1, May 2010.*

(Continued)

*Primary Examiner* — Michael P Mooney
(74) *Attorney, Agent, or Firm* — Knobbe, Martens, Olson & Bear, LLP

(57) ABSTRACT

A display system comprises a waveguide having light incoupling or light outcoupling optical elements formed of a metasurface. The metasurface is a multilevel (e.g., bi-level) structure having a first level defined by spaced apart protrusions formed of a first optically transmissive material and a second optically transmissive material between the protrusions. The metasurface also includes a second level formed by the second optically transmissive material. The protrusions on the first level may be patterned by nanoimprinting the first optically transmissive material, and the second optically transmissive material may be deposited over and between the patterned protrusions. The widths of the protrusions and the spacing between the protrusions may be selected to diffract light, and a pitch of the protrusions may be 10-600 nm.

39 Claims, 20 Drawing Sheets

(51) Int. Cl.
*G02B 27/01* (2006.01)
*G02B 6/293* (2006.01)
*G02B 6/122* (2006.01)
*G02B 5/18* (2006.01)

(52) U.S. Cl.
CPC ......... *G02B 6/0026* (2013.01); *G02B 6/0031* (2013.01); *G02B 6/0065* (2013.01); *G02B 6/29316* (2013.01); *G02B 27/0172* (2013.01); *G02B 5/1823* (2013.01); *G02B 6/1226* (2013.01); *G02B 2027/0134* (2013.01)

(58) Field of Classification Search
CPC .. G02B 6/0031; G02B 6/0033; G02B 6/0035; G02B 6/0036; G02B 6/0038; G02B 6/005; G02B 6/0065; G02B 6/0076; G02B 6/1226; G02B 6/124; G02B 6/02085; G02B 6/12007; G02B 6/02138; G02B 6/022; G02B 6/29316; G02B 27/0172; G02B 27/283; G02B 27/4272; G02B 5/1809; G02B 5/1833; G02B 5/3016; G02B 1/002
USPC ....... 349/62–65; 362/600, 608, 610; 385/37, 385/129–132, 146, 901
See application file for complete search history.

(56) References Cited

U.S. PATENT DOCUMENTS

| | | | |
|---|---|---|---|
| 7,905,650 B2 | 3/2011 | Ma et al. | |
| 7,991,257 B1* | 8/2011 | Coleman | B29D 11/0073 264/1.24 |
| 8,467,643 B2* | 6/2013 | Iizuka | G02B 5/1819 385/37 |
| 8,917,447 B2 | 12/2014 | Wolk et al. | |
| 8,950,867 B2 | 2/2015 | Macnamara | |
| 9,081,426 B2 | 7/2015 | Armstrong | |
| 9,176,065 B2 | 11/2015 | Bond et al. | |
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 9,887,459 B2 | 2/2018 | Casciato et al. | |
| 10,254,454 B2* | 4/2019 | Klug | G02B 5/1833 |
| 10,466,394 B2 | 11/2019 | Lin et al. | |
| 10,527,851 B2 | 1/2020 | Lin et al. | |
| 2004/0233534 A1 | 11/2004 | Nakanishi et al. | |
| 2005/0161589 A1 | 7/2005 | Kim et al. | |
| 2006/0028436 A1 | 2/2006 | Armstrong | |
| 2006/0056166 A1* | 3/2006 | Yeo | G02B 6/0056 362/19 |
| 2006/0126179 A1* | 6/2006 | Levola | G02B 27/4272 359/563 |
| 2006/0126699 A1 | 6/2006 | Kaneda | |
| 2006/0240232 A1 | 10/2006 | Faris | |
| 2007/0081123 A1 | 4/2007 | Lewis | |
| 2007/0188837 A1* | 8/2007 | Shimizu | G02B 5/32 359/13 |
| 2008/0043302 A1* | 2/2008 | Park | G02B 5/32 359/15 |
| 2008/0176041 A1 | 7/2008 | Sato et al. | |
| 2008/0225391 A1 | 9/2008 | Walter et al. | |
| 2009/0154871 A1* | 6/2009 | Pyo | G02B 6/124 385/14 |
| 2010/0039707 A1 | 2/2010 | Akahane et al. | |
| 2010/0054662 A1 | 3/2010 | Hofrichter et al. | |
| 2010/0157400 A1* | 6/2010 | Dimov | G02B 5/188 359/13 |
| 2010/0232017 A1 | 9/2010 | McCarthy et al. | |
| 2011/0069727 A1 | 3/2011 | Reid et al. | |
| 2011/0141541 A1 | 6/2011 | Bratkovski | |
| 2011/0141873 A1 | 6/2011 | Miyasaka et al. | |
| 2011/0166045 A1 | 7/2011 | Dhawan et al. | |
| 2011/0170184 A1 | 7/2011 | Wolk | |
| 2011/0268145 A1 | 11/2011 | Kikuta et al. | |
| 2012/0013989 A1 | 1/2012 | Choi et al. | |
| 2012/0099817 A1 | 4/2012 | Quan et al. | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0105438 A1 | 5/2013 | Zhu et al. | |
| 2013/0117377 A1 | 5/2013 | Miller | |
| 2013/0125027 A1 | 5/2013 | Abovitz | |
| 2013/0176554 A1 | 7/2013 | Loncar et al. | |
| 2013/0208234 A1 | 8/2013 | Lewis | |
| 2013/0208332 A1 | 8/2013 | Yu et al. | |
| 2013/0242262 A1 | 9/2013 | Lewis | |
| 2014/0063585 A1 | 3/2014 | Hagoplan et al. | |
| 2014/0064655 A1 | 3/2014 | Nguyen et al. | |
| 2014/0071539 A1 | 3/2014 | Gao | |
| 2014/0140653 A1 | 5/2014 | Brown et al. | |
| 2014/0146390 A1 | 5/2014 | Kaempfe et al. | |
| 2014/0167022 A1 | 6/2014 | Huh et al. | |
| 2014/0177023 A1 | 6/2014 | Gao et al. | |
| 2014/0218468 A1 | 8/2014 | Gao et al. | |
| 2014/0264998 A1 | 9/2014 | Smith et al. | |
| 2014/0267420 A1 | 9/2014 | Schowengerdt | |
| 2014/0272295 A1 | 9/2014 | Deshpande et al. | |
| 2014/0306866 A1 | 10/2014 | Miller et al. | |
| 2014/0333926 A1 | 11/2014 | Bond et al. | |
| 2015/0016777 A1 | 1/2015 | Abovitz et al. | |
| 2015/0040978 A1 | 2/2015 | Shalaev et al. | |
| 2015/0103306 A1 | 4/2015 | Kaji et al. | |
| 2015/0116721 A1 | 4/2015 | Kats et al. | |
| 2015/0167921 A1 | 6/2015 | Gollier et al. | |
| 2015/0178939 A1 | 6/2015 | Bradski et al. | |
| 2015/0205126 A1* | 7/2015 | Schowengerdt | G02B 3/0006 345/633 |
| 2015/0219806 A1 | 8/2015 | Arbabi et al. | |
| 2015/0219842 A1 | 8/2015 | Sqalli et al. | |
| 2015/0222883 A1 | 8/2015 | Welch | |
| 2015/0222884 A1 | 8/2015 | Cheng | |
| 2015/0253570 A1 | 9/2015 | Sunnari et al. | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | Tekolste et al. | |
| 2015/0346495 A1 | 12/2015 | Welch et al. | |
| 2016/0011419 A1 | 1/2016 | Gao | |
| 2016/0025626 A1 | 1/2016 | Dos Santos Fegadolli et al. | |
| 2016/0025914 A1 | 1/2016 | Brongersma et al. | |
| 2016/0026253 A1 | 1/2016 | Bradski et al. | |
| 2016/0061993 A1 | 3/2016 | Ren et al. | |
| 2016/0077261 A1 | 3/2016 | Arbabi et al. | |
| 2016/0110920 A1 | 4/2016 | Schowengerdt | |
| 2016/0154044 A1 | 6/2016 | Bertness | |
| 2016/0306079 A1 | 10/2016 | Arbabi et al. | |
| 2017/0010488 A1 | 1/2017 | Klug et al. | |
| 2017/0235144 A1* | 8/2017 | Piskunov | G02B 5/32 359/13 |
| 2017/0322418 A1 | 11/2017 | Lin et al. | |
| 2018/0045953 A1 | 2/2018 | Fan et al. | |
| 2018/0217395 A1 | 8/2018 | Lin et al. | |
| 2018/0231702 A1 | 8/2018 | Lin | |

(56) References Cited

U.S. PATENT DOCUMENTS

| | | | |
|---|---|---|---|
| 2020/0142110 | A1 | 5/2020 | Lin |
| 2020/0150437 | A1 | 5/2020 | Lin |

FOREIGN PATENT DOCUMENTS

| | | | |
|---|---|---|---|
| CN | 103620478 | | 3/2014 |
| CN | 111399107 | A | 7/2020 |
| GB | 1588370 | | 4/1981 |
| JP | 60-140204 | | 7/1985 |
| JP | 62-86307 | | 4/1987 |
| JP | H06-347630 | | 12/1994 |
| JP | 2003-502708 | A | 1/2003 |
| JP | 2007-033558 | | 2/2007 |
| JP | 2007-079608 | | 3/2007 |
| JP | 2008-535032 | | 8/2008 |
| JP | 2009-169213 | A | 7/2009 |
| JP | 2009-169214 | A | 7/2009 |
| JP | 2009-192979 | A | 8/2009 |
| JP | 2009-288718 | | 12/2009 |
| JP | 2010-139621 | | 6/2010 |
| JP | WO 2011/001641 | | 1/2011 |
| JP | 2012-27221 | A | 2/2012 |
| JP | 2012-256055 | A | 12/2012 |
| JP | 2014-142386 | A | 8/2014 |
| JP | 2015-049376 | | 3/2015 |
| JP | 2015-105990 | | 6/2015 |
| JP | 2015-524935 | | 8/2015 |
| JP | 2015-166861 | | 9/2015 |
| JP | 2015-194551 | | 11/2015 |
| JP | 2015-534117 | | 11/2015 |
| KR | 10-1556356 | | 9/2015 |
| TW | 201530195 | A | 8/2015 |
| TW | 201546580 | A | 12/2015 |
| WO | WO 2000/79317 | | 12/2000 |
| WO | WO 2006/041596 | | 4/2006 |
| WO | WO 2006/063049 | | 6/2006 |
| WO | WO 2006/0106501 | | 10/2006 |
| WO | WO 2007/089073 | | 8/2007 |
| WO | WO 2008/056577 | | 5/2008 |
| WO | WO 2013/162609 | | 10/2013 |
| WO | WO 2014/044912 | | 3/2014 |
| WO | WO 2015/023536 | | 2/2015 |
| WO | WO 2015/081313 | | 6/2015 |
| WO | WO 2016/161175 | | 10/2016 |
| WO | WO 2016/168173 | | 10/2016 |
| WO | WO 2016/205256 | | 12/2016 |
| WO | WO 2017/079480 | | 5/2017 |
| WO | WO 2017/193012 | | 11/2017 |
| WO | WO 2018/140651 | | 8/2018 |
| WO | WO 2018/140502 | | 3/2019 |

OTHER PUBLICATIONS

International Search Report and Written Opinion for PCT Application No. PCT/US16/60392, dated Feb. 6, 2017.
Kildishev, A. et al., "Planar Photonics with Metasurfaces", Science, vol. 339, Mar. 15, 2013, in 9 pages. URL: http://dx.doi.org/10.1126/science.1232009.
Yu, N. et al., "Optical Metasurfaces and Prospect of Their Applications Including Fiber Optics", Journal of Lightwave Technology, vol. 33, No. 12, Jun. 15, 2015, in 15 pages. URL: http://ieeexplore.ieee.org/document/7045485/.
Aieta, F. et al., "Multiwavelength achromatic metasurfaces by dispersive phase compensation," Science, vol. 347, Issue 6228, Mar. 20, 2015, in 5 pages. URL: www.sciencemag.org.
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
Cunningham, B. et al., "A plastic colorimetric resonant optical biosensor for multiparallel detection of label-free biochemical interactions," Sensors and Actuators B, vol. 85, Jul. 2002, in 8 pages.
Hasman, E. et al., "Polarization dependent focusing lens by use of quantized Pancharatnam—Berry phase diffractive optics", Applied Physics Letters, vol. 82, No. 3, Jan. 20, 2003, in 3 pages.
Khorasaninejad, M. et al., "Broadband Multifunctional Efficient Meta-Gratings Based on Dielectric Waveguide Phase Shifters", Nano Letters, vol. 15, Sep. 2015, in 7 pages.
Lin, D. et al., "Dielectric gradient metasurface optical elements", Science, vol. 345, Issue 6194, Jul. 18, 2014, in 6 pages.
Lin, D. et al., "Supplementary Materials for Dielectric gradient metasurface optical elements", Science, vol. 345, Issue 6194, Jul. 18, 2014, in 22 pages.
Pors, A. et al., "Gap plasmon-based metasurfaces for total control of reflected light", Scientific Reports, vol. 3, Jul. 8, 2013, in 6 pages.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
Zhu, A. Y. et al., "Broadband visible wavelength high efficiency meta-gratings", Conference on Lasers and Electro-Optics, OSA Technical Digest (online), Jan. 2016, in 2 pages.
International Preliminary Report on Patentability for PCT Application No. PCT/US16/60392, dated May 8, 2018.
U.S. Appl. No. 15/588,350, Metasurfaces with Asymmetric Gratings for Redirecting Light and Methods for Fabricating, filed May 5, 2017.
European Extended Search Report, re EP Application No. 16862999.6, dated Aug. 19, 2019.
ARToolKit: https://web.archive.org/web/20051013062315/http://www.hitl.washington.edu:80/artoolkit/documentation/hardware.htm, archived Oct. 13, 2005.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
Invitation to Pay Additional Fees And, Where Applicable, Protest Fee for PCT Application No. PCT/US2017/031328, dated Jul. 10, 2017.
International Search Report and Written Opinion for PCT Application No. PCT/US2017/031328, dated Sep. 21, 2017.
International Preliminary Report on Patentability for PCT Application No. PCT/US2017/031328, dated Nov. 6, 2018.
International Search Report and Written Opinion for PCT Application No. PCT/US2018/015057, dated Apr. 5, 2018.
International Search Report and Written Opinion for PCT Application No. PCT/US18/15324, dated May 10, 2018.
Shalaev et al., "High-Efficiency All Dielectric Metasurfaces for Ultra-Compact Beam Manipulation in Transmission Mode," Nano letters 15.9 (2015): 6261-6266.
Hongqiang, et al., "Large-Area Binary Blazed Grating Coupler between Nanophotonic Waveguide and LED," The Scientific World Journal, vol. 2014, Article ID 586517, in six pages.
Laakkonen, et al., "Double-groove, two-depth grating coupler for light guides," J. Opt. Soc. Am. A/vol. 23, No. 12/Dec. 2006.
Zhou, et al., "Silicon photonic devices based on binary blazed gratings," Optical Engineering 52(9), Sep. 2013.
U.S. Appl. No. 15/588,350, Metasurfaces with Asymetric Gratings for Redirecting Light and Methods for Fabricating, filed May 5, 2017

(56) References Cited

OTHER PUBLICATIONS

U.S. Appl. No. 15/879,005, Antireflection Coatings for Metasurfaces, filed Jan. 24, 2018.
U.S. Appl. No. 15/880,404, Diffraction Gratings formed by Metasurfaces Having Differently Oriented Nanobeams, filed Jan. 25, 2018.
Yang, et al., "Manipulating light polarization with ultrathin plasmonic metasurfaces," Phys, Rev. B, vol. 84, No. 20, Nov. 1, 2011.

* cited by examiner

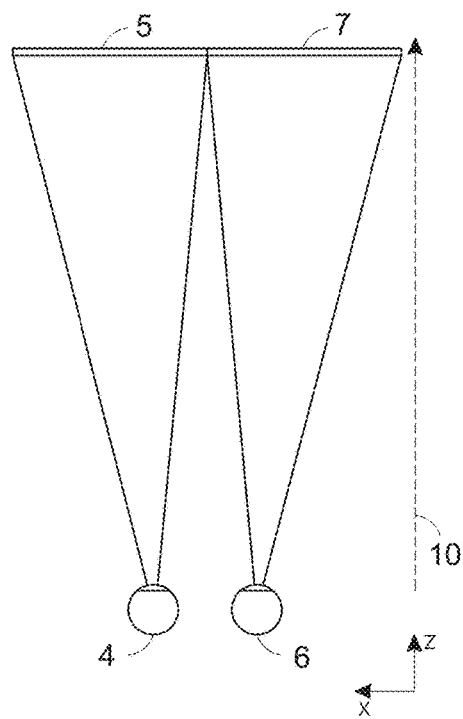
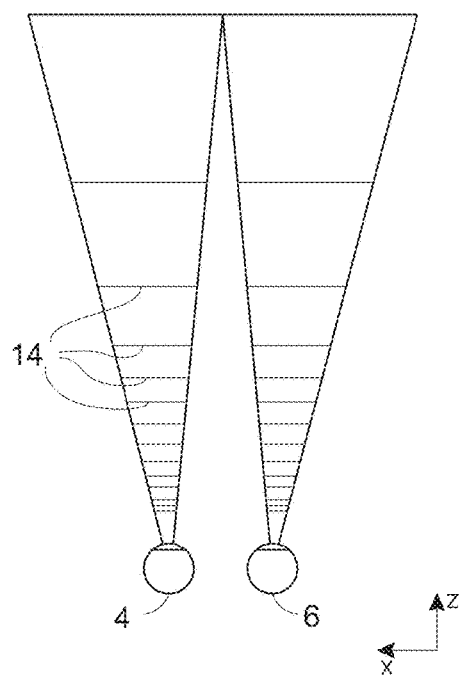
FIG. 3
(Prior Art)
FIG. 4

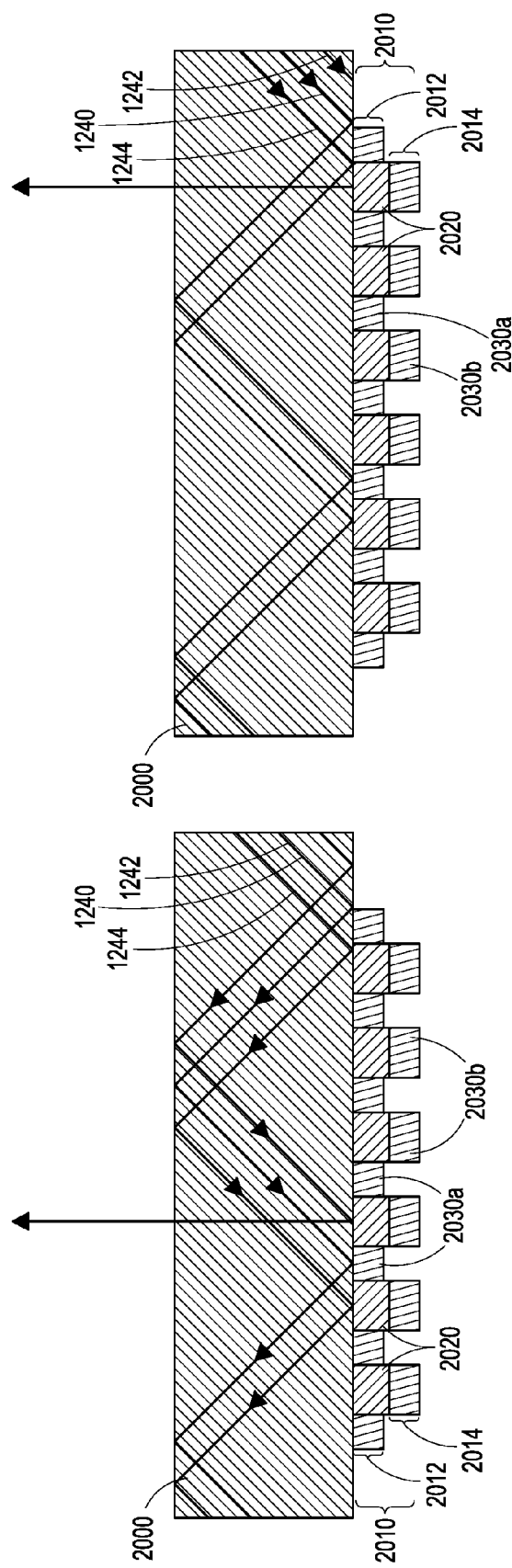

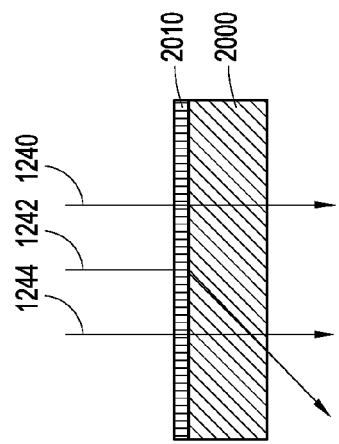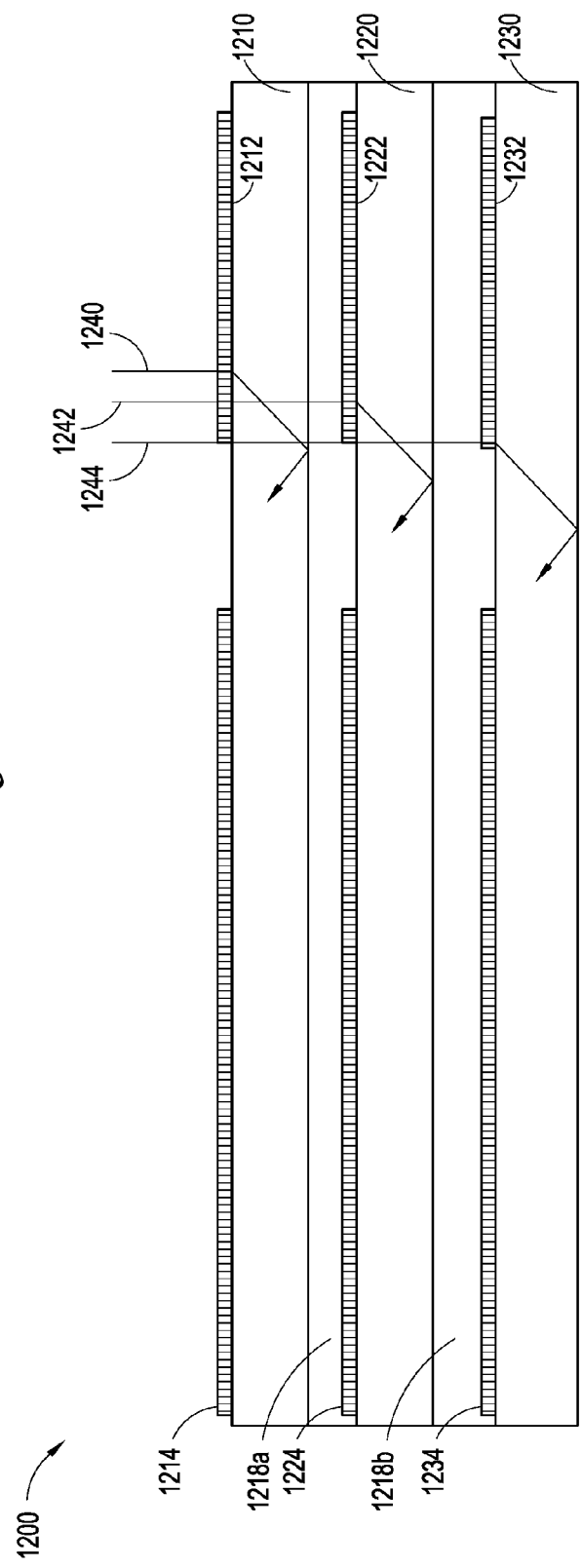

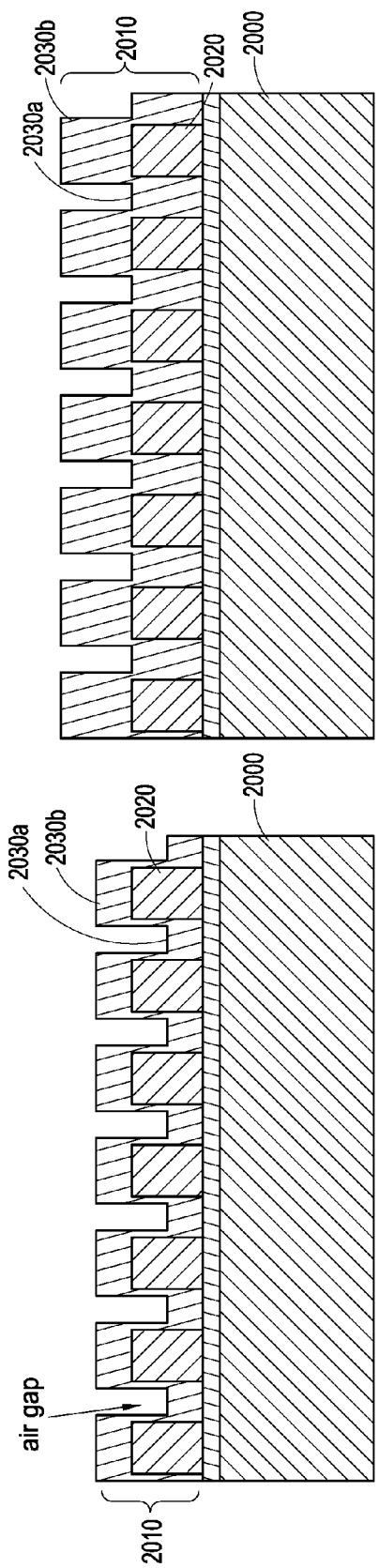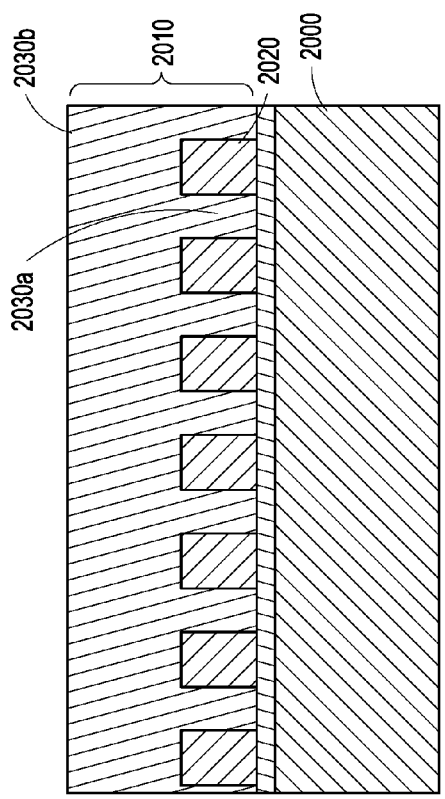

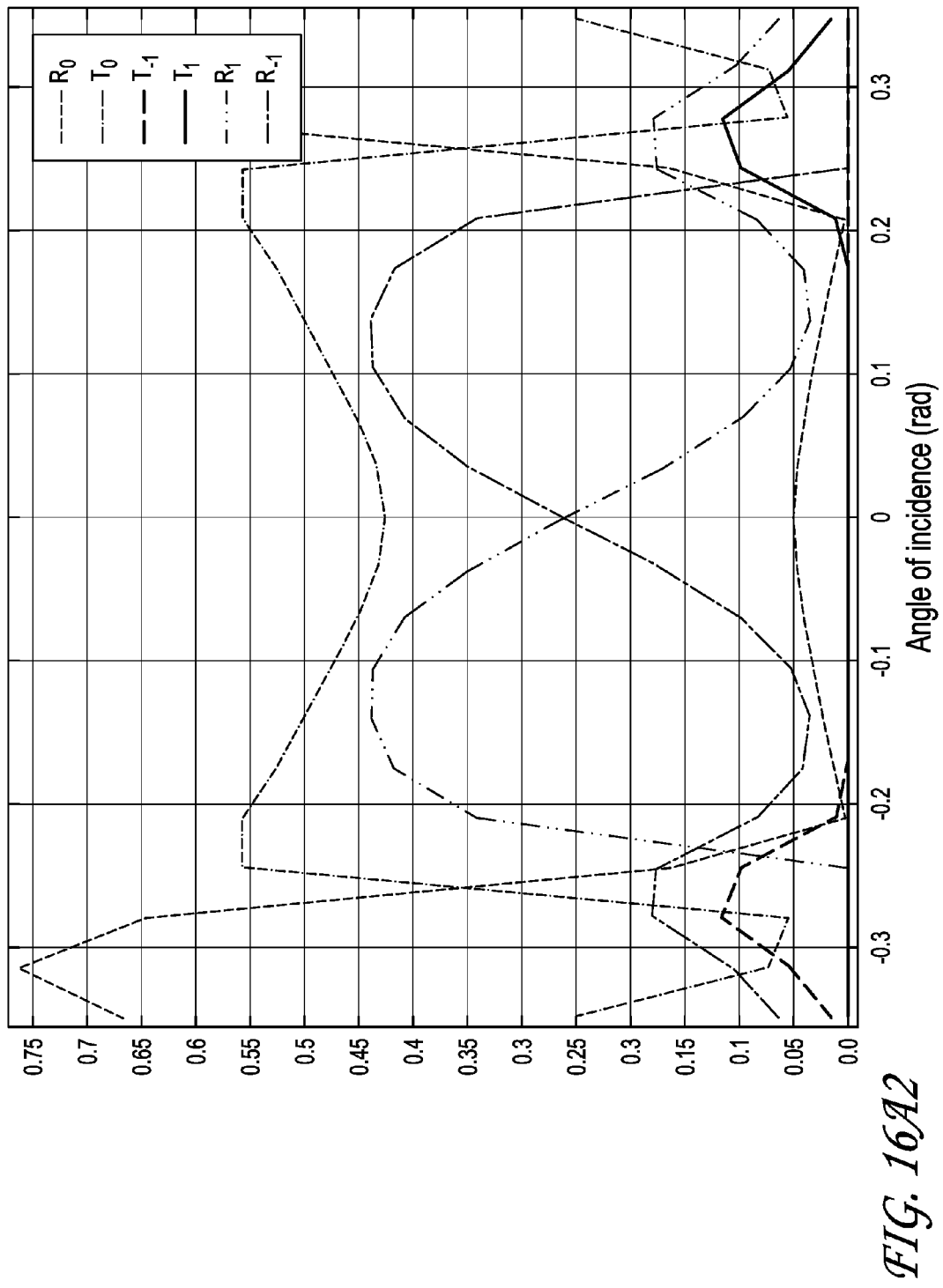
FIG. 16A2

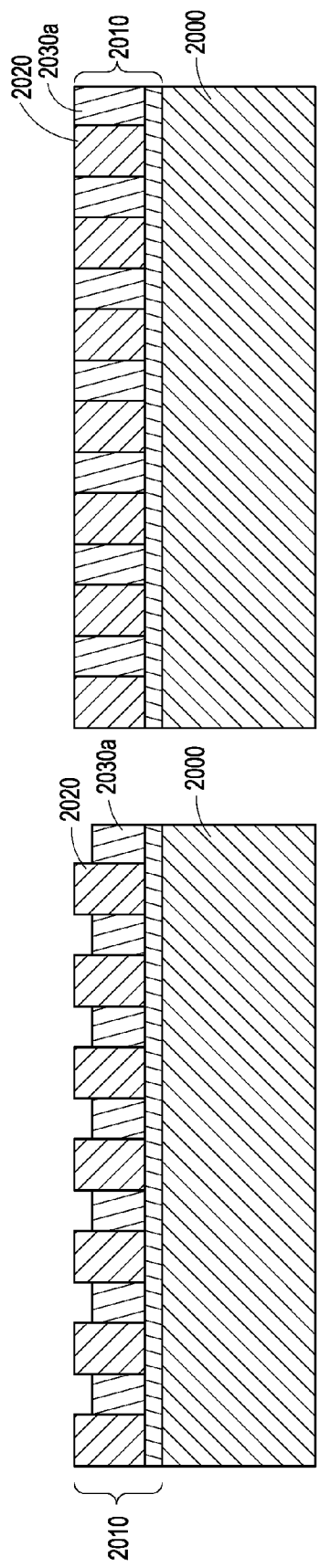
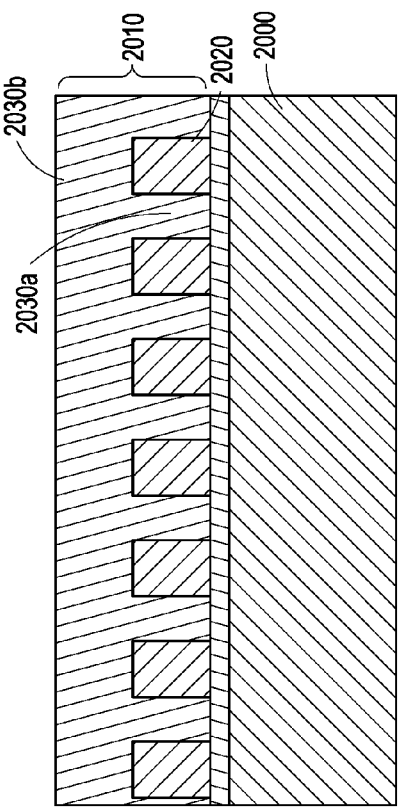
FIG. 17A
FIG. 17B
FIG. 17C

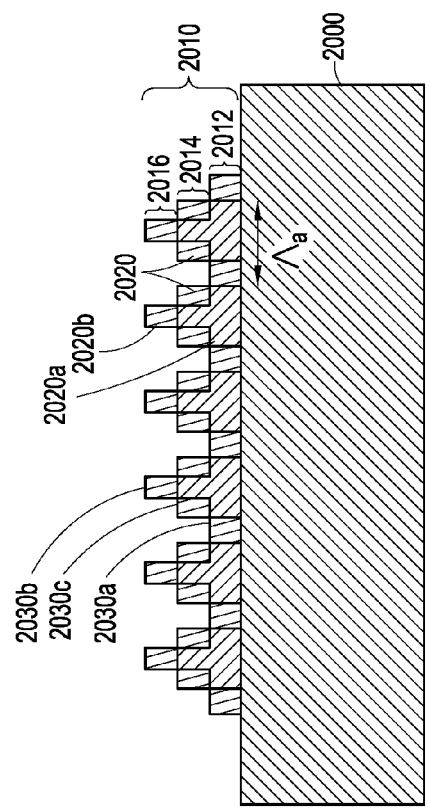
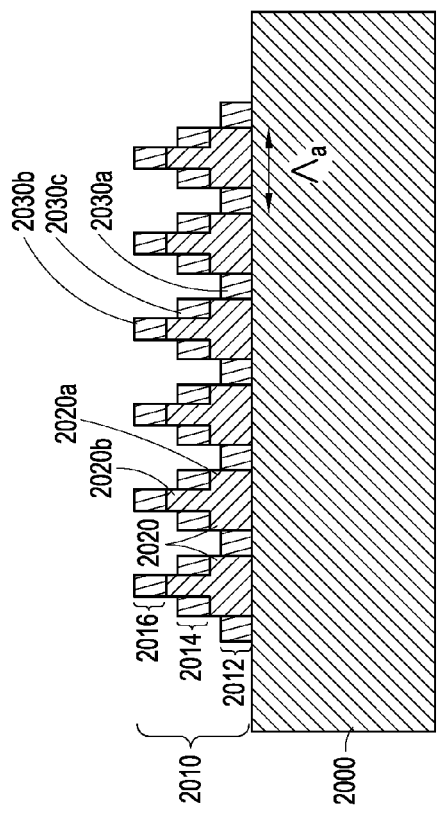

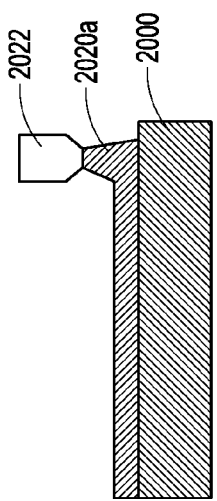
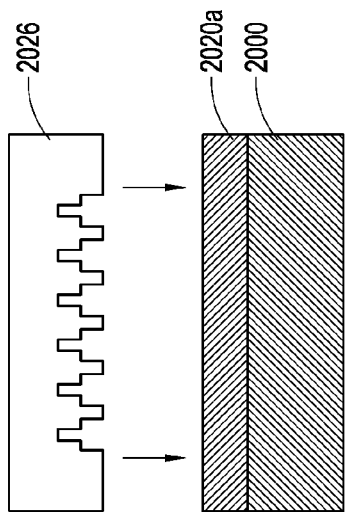
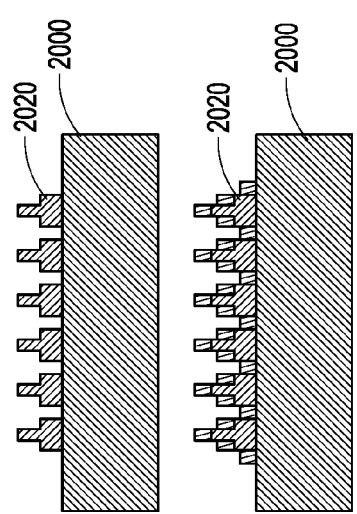
FIG. 19A
FIG. 19B
FIG. 19C
FIG. 19D

METASURFACES FOR REDIRECTING LIGHT AND METHODS FOR FABRICATING

PRIORITY CLAIM

This application claims the priority benefit of the following: U.S. Provisional Patent Application No. 62/252,315, filed on Nov. 6, 2015, entitled "METASURFACES FOR REDIRECTING LIGHT AND METHODS FOR FABRICATING"; and U.S. Provisional Patent Application No. 62/252,929, filed on Nov. 9, 2015, entitled "METASURFACES FOR REDIRECTING LIGHT AND METHODS FOR FABRICATING." The entirety of each of these priority documents is incorporated herein by reference.

INCORPORATION BY REFERENCE

This application also incorporates by reference the entirety of each of the following patent applications: U.S. application Ser. No. 14/331,218 ; U.S. application Ser. No. 14/641,376 ; U.S. Provisional Application No. 62/012,273 ; and U.S. Provisional Application No. 62/005,807.

BACKGROUND

Field

The present disclosure relates to augmented and virtual reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce a VR or AR technology that facilitates a comfortable, natural-feeling, rich presentation of virtual image elements amongst other virtual or real-world imagery elements.

Systems and methods disclosed herein address various challenges related to VR and AR technology.

SUMMARY

In some embodiments, a method for forming an optical waveguide comprises providing an optically transmissive resist layer overlying an optically transmissive substrate. The resist is patterned with a pattern comprising protrusions and intervening gaps, wherein the protrusions have a pitch in a range of 10 nm to 600 nm. An optically transmissive material is deposited on the protrusions and into the gaps between the protrusions.

In some other embodiments, a method of making a display device comprises providing a waveguide comprising a metasurface. The metasurface comprises a plurality of spaced apart protrusions formed of a first optically transmissive material, and a second optically transmissive material over and between the spaced apart protrusions. The waveguide may be optically coupled to a light pipe.

In yet other embodiments, a display system comprises a waveguide and a light incoupling optical element disposed on a surface of the waveguide. The light incoupling optical element comprises a multilevel metasurface, which comprises: a plurality of spaced apart protrusions having a pitch and formed of a first optically transmissive material, and a second optically transmissive material over and between the spaced apart protrusions.

In some other embodiments, a display system comprises a waveguide and a light outcoupling optical element disposed on a surface of the waveguide. The light outcoupling optical element comprises a multilevel metasurface, which comprises a plurality of spaced apart protrusions having a pitch and formed of a first optically transmissive material; and a second optically transmissive material over and between the spaced apart protrusions.

In yet other embodiments, a display system comprises a waveguide and a light incoupling optical element disposed on a surface of the waveguide. The light incoupling optical element comprises a metasurface comprising a plurality of spaced apart protrusions formed of a first optically transmissive material, and an optically transmissive resist between the spaced apart protrusions.

In some other embodiments, a display system comprises a waveguide and a light outcoupling optical element disposed on a surface of the waveguide. The light outcoupling optical element comprises a metasurface comprising a plurality of spaced apart protrusions formed of a first optically transmissive material, and an optically transmissive resist between the spaced apart protrusions.

Additional and other objects, features, and advantages of the invention are described in the detail description, figures and claims.

BRIEF DESCRIPTION OF THE DRAWINGS

FIG. 3 illustrates a conventional display system for simulating three-dimensional imagery for a user.

FIG. 4 illustrates aspects of an approach for simulating three-dimensional imagery using multiple depth planes.

FIGS. 12A-12B show examples of cross-sectional side views of metasurfaces outcoupling light from waveguides.

FIGS. 13A-13B shows examples of metasurfaces operating in a transmissive mode.

FIGS. 16A1 and 16B-16C illustrate examples of cross-sectional side views of metasurface structures in which a second material is deposited to different thicknesses over an underlying pattern of protrusions.

FIG. 16A2 shows a plot of the transmission and reflection spectrum for a metasurface having the general structure shown in FIG. 16A1.

FIGS. 17A-17C illustrate examples of cross-sectional side views of metasurface structures in which a second material is a resist deposited by spin or jet coating.

FIGS. 18A-18B illustrate examples of cross-sectional side views of metasurfaces having more than two levels.

FIGS. 19A-19D illustrate an example of a process flow for forming metasurfaces having more than two levels.

Figure 1:
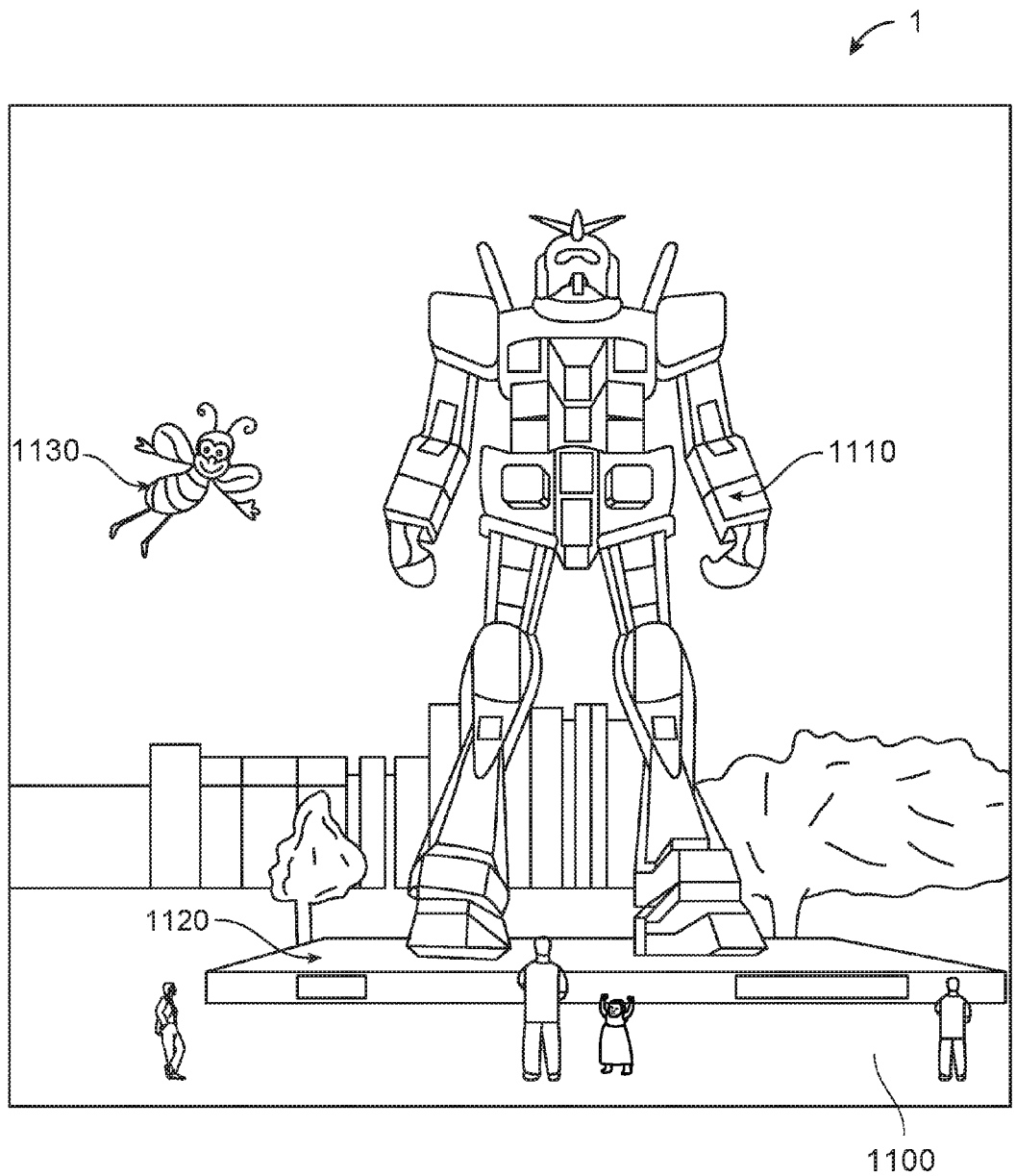
FIG. 1 illustrates a user's view of augmented reality (AR) through an AR device.

The drawings are provided to illustrate example embodiments described herein and are not intended to limit the scope of the disclosure. It will be appreciated that the drawings are schematic and not necessarily drawn to scale.

DETAILED DESCRIPTION

Metasurfaces, metamaterials of reduced dimensionality, provide opportunities to realize virtually flat, aberration-free optics on much smaller scales, in comparison with geometrical optics. Without being limited by theory, in some embodiments, metasurfaces include dense arrangements of surface structures that function as resonant optical antennas. The resonant nature of the light-surface structure interaction provides the ability to manipulate optical wave-fronts.

Metasurfaces, however, are typically formed with exceptionally high refractive index materials while their typical applications are limited to infrared wavelengths due to the inherently high absorption elsewhere. For example, metasurfaces for beam shaping have been developed for near-infrared light using high refractive index opaque materials such as silicon wafers. These metasurface structures based on high refractive index materials, however, can absorb an undesirably large percentage of impinging light (e.g., 40% or more) when transmitting light of visible wavelengths across the thickness of the structures. Visable wavelength transparent materials, such as silicon nitride with a refractive index of about 2, have not been considered to have a sufficiently high refractive index to support the optical resonance desired to effectively manipulate optical wave-fronts.

Metasurfaces also face challenges in their manufacture. Given the sizes of the surface structures forming metasurfaces and their characteristics features, which are below the wavelength of incoming light, lithography and etch processes are typically used to fabricate the surfaces. Such processes and the equipment used for these processes, however, are prohibitively costly, especially when the metasurface extends across a large surface area, which may be few thousand times larger than the characteristics size of metamaterial structure.

Advantageously, according to some embodiments disclosed herein, a multi-level metasurface allows the use of relatively low refractive index materials, while providing highly wavelength selective redirection of light, including light in the visible part of optical spectrum. Preferably, the metasurface selectively redirects some wavelengths of light, while being transmissive to other wavelengths of light. Such properties are typically engineered with structures on micron scales (e.g., in photonics crystal fibers or distributed bragg reflectors), while various embodiments herein include multi-level geometries on nano-scales (e.g. 10-100× smaller scales), and provide selective redirection of light in the visible part of the electromagnetic spectrum. Such metasurfaces, having multi-level functionality, offers advantages over stacked one-by-one architectures of layers of single functionality. Moreover, the metasurface structures may be formed by patterning with nanoimprinting, thereby avoiding costly lithography and etch processes.

In some embodiments, the metasurface is a multilevel (e.g., bi-level) structure having a first level defined by spaced apart protrusions formed of a first optically transmissive material and a second optically transmissive material between the protrusions. The metasurface also includes a second level formed by the second optically transmissive material disposed on a top surface of the protrusions. The first and second optically transmissive materials may be formed on an optically transmissive substrate, e.g., a waveguide. The first and second optically transmissive materials may be deposited on the substrate. In some embodiments, the first and second optically transmissive materials may be amorphous or crystalline. In some embodiments, the pitch of the protrusions and the heights of the first and second levels are configured to redirect light, e.g. by diffraction. In some embodiments, the metasurface may be three-level or higher structure in which the protrusions take the form of steps, with the second optically transmissive material at the sides and on upper surfaces of the protrusions.

In some embodiments, the pitch of the protrusions is about 10 nm-1 µm, 10-600 nm, about 200-500 nm, or about 300-500 nm, and the heights of each level is about 10 nm-1 µm, about 10-500 nm, about 50-500 nm, or about 100-500 nm. It will be appreciated that the pitch of the protrusions and the height (or thickness) of each level may be selected depending upon the wavelength of light that is desired for redirection and the angle of the redirection. In some embodiments, the pitch is less than a wavelength of light that the metasurface is configured to redirect. In some embodiments, the second optically transmissive material partially or fully occupies a space between the protrusions, but does not extend above the protrusions. In some embodiments, in addition to the pitch and the heights of each level, the widths of the protrusions may be selected based upon the wavelength of light that is desired for redirection and the angle of the redirection. As examples, the protrusions may have widths of about 10 nm-1 µm, including 10-250 nm.

As disclosed herein, the protrusions on the first level, or levels below the top level of a three or higher level structure, may be patterned by lithography and etching, in some embodiments. More preferably, the protrusions may be patterned by nanoimprinting the first optically transmissive material. The second optically transmissive material may then be deposited between (and, in some embodiments, over) the patterned protrusions. The deposition may be accomplished by various processes, including directional depositions, blanket depositions (e.g., conformal depositions), and spin or jet-coating. In some embodiments, the second optically transmissive material is deposited to a thickness such that the material rests between and on top of the protrusions, with the second optically transmissive material forming a plateau of material over each of the protrusions and leaving a gap between the plateaus on the top level and the protrusions on lower levels. In some other embodiments, the deposition proceeds to such an extent that the gap between the protrusions is filled. In yet other embodiments, the deposition of the second optically transmissive material proceeds to such an extent that a continuous layer of the second optically transmissive material is formed on the second level.

In some embodiments, the waveguides may form direct view display devices or near-eye display devices, with the waveguides configured to receive input image information and generate an output image based on the input image information. These devices may be wearable and constitute eyewear in some embodiments. The input image information received by the waveguides can be encoded in multiplexed light streams of different wavelengths (e.g., red, green and blue light) that are incoupled into one or more waveguides. Incoupled light may propagate through the waveguide due to total internal reflection. The incoupled light may be outcoupled (or outputted) from the waveguide by one or more outcoupling optical elements.

Advantageously, the metasurface may be formed on a waveguide and may be an incoupling and/or outcoupling optical element. The compactness and planarity of the metasurface allows for a compact waveguide, and for a compact stack of waveguides where multiple waveguides form a stack. In addition, the high wavelength selectivity of the metasurface allows for a high degree of precision in incoupling and/or outcoupling light, which can provide high image quality in applications where the light contains image information. For example, the high selectivity may reduce channel crosstalk in configurations in which full color images are formed by outputting light of different colors or wavelengths at the same time.

It will be appreciated that the metasurface may selectively redirect light by reflection or diffraction in some embodiments. For example, the metasurface may reflect light of one or more wavelengths, while transmitting light of other wavelengths. Advantageously, redirection of light in such a "reflective mode" provides tight control and high specificity over the wavelengths of light that are redirected by reflection or diffraction. In some other embodiments, the metasurface may function in a "transmissive mode" in which it selectively redirects light of one or more wavelengths while also transmitting that light and while transmitting light of other wavelengths without substantially changing the path of the light of those other wavelengths.

Reference will now be made to the Figures, in which like reference numbers refer to like features throughout.

Example Display Systems

Various embodiments disclosed herein may be implemented as display systems generally. In some embodiments, the display systems take the form of eyewear (e.g., they are wearable), which may advantageously provide a more immersive VR or AR experience. For example, displays containing waveguides for displaying multiple depth planes, e.g. a stack of waveguides (one waveguide or set of waveguides for each depth plane), may be configured to be worn positioned in front of the eyes of a user, or viewer. In some embodiments, multiple waveguides, e.g. two stacks of waveguides, one for each eye of a viewer, may be utilized to provide different images to each eye.

Figure 2:
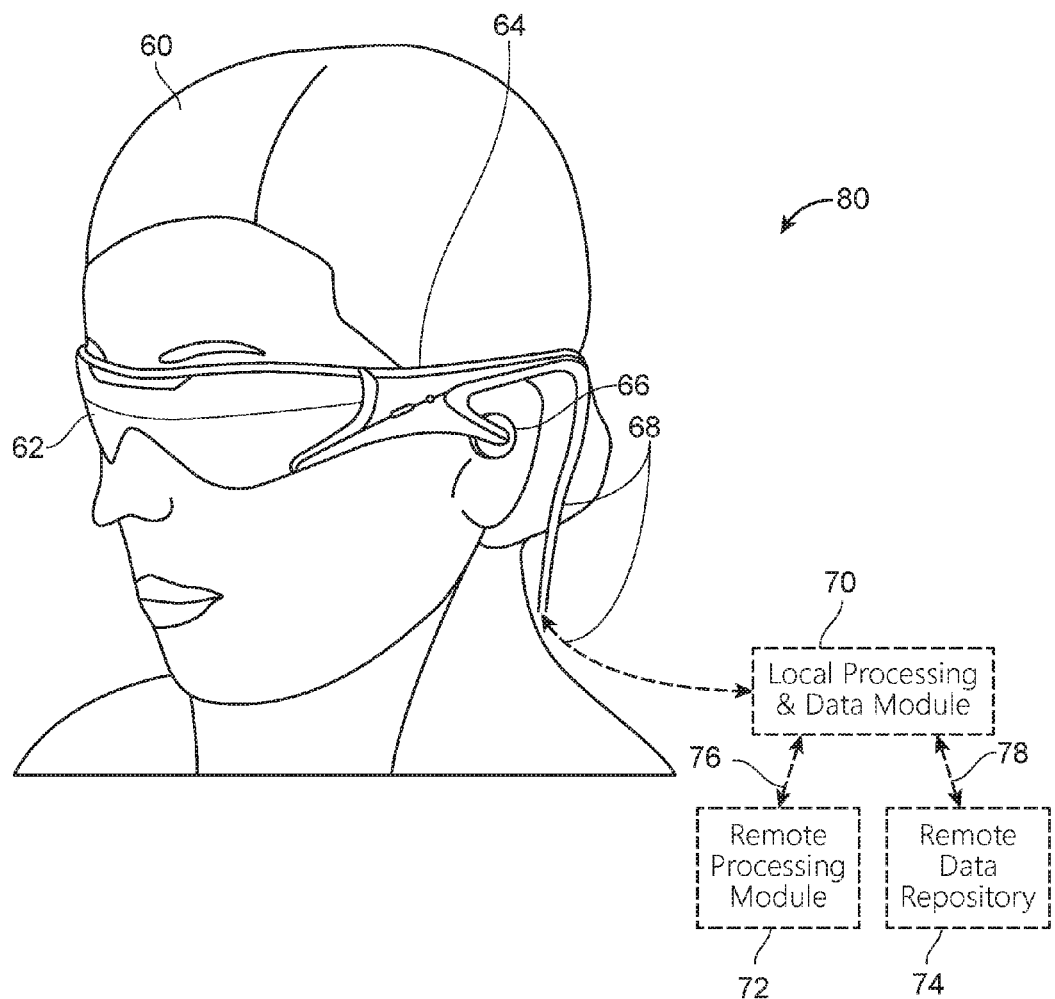
FIG. 2 illustrates an example of wearable display system.

FIG. 2 illustrates an example of wearable display system 80. The display system 80 includes a display 62, and various mechanical and electronic modules and systems to support the functioning of that display 62. The display 62 constitutes eyewear and may be coupled to a frame 64, which is wearable by a display system user or viewer 60 and which is configured to position the display 62 in front of the eyes of the user 60. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems). In some embodiments, the display system may include one or more cameras (not shown), which may be attached to the frame 64, or otherwise attached to the user 60. The camera may be positioned and oriented to capture images of an ambient environment in which the user 60 is located.

With continued reference to FIG. 2, the display 62 is operatively coupled 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the location processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be stand alone structures that communicate with the location processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. Additionally, while shown as flat for ease of illustration, it will be appreciated that the contours of a depth plane may be curved in physical space, such that all features in a depth plane are in focus with the eye in a particular accommodated state.

Figure 5A:
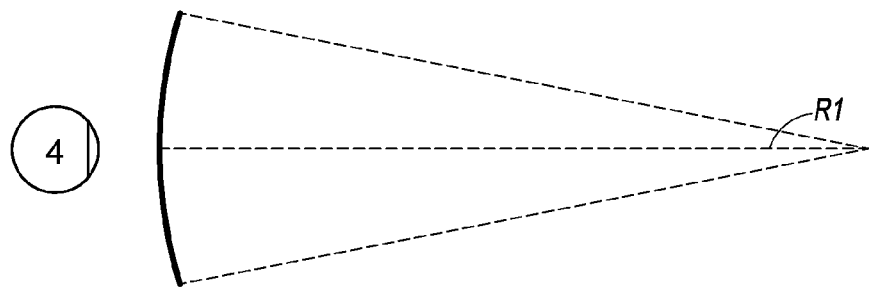
FIGS. 5A-5C illustrate relationships between radius of curvature and focal radius.
Figure 5B:
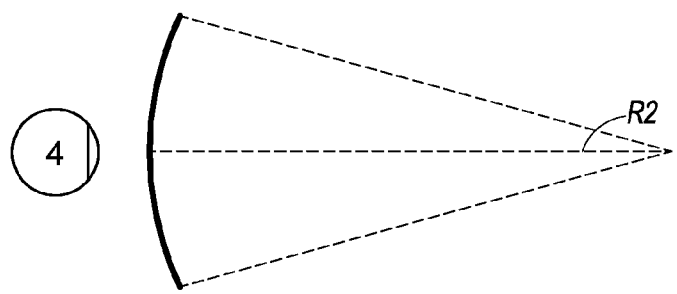
Figure 5C:
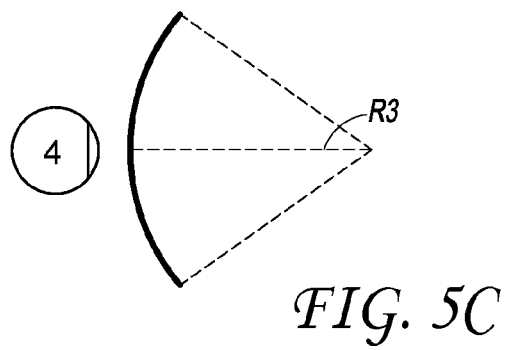

The distance between an object and the eye 4 or 6 can also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and various other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
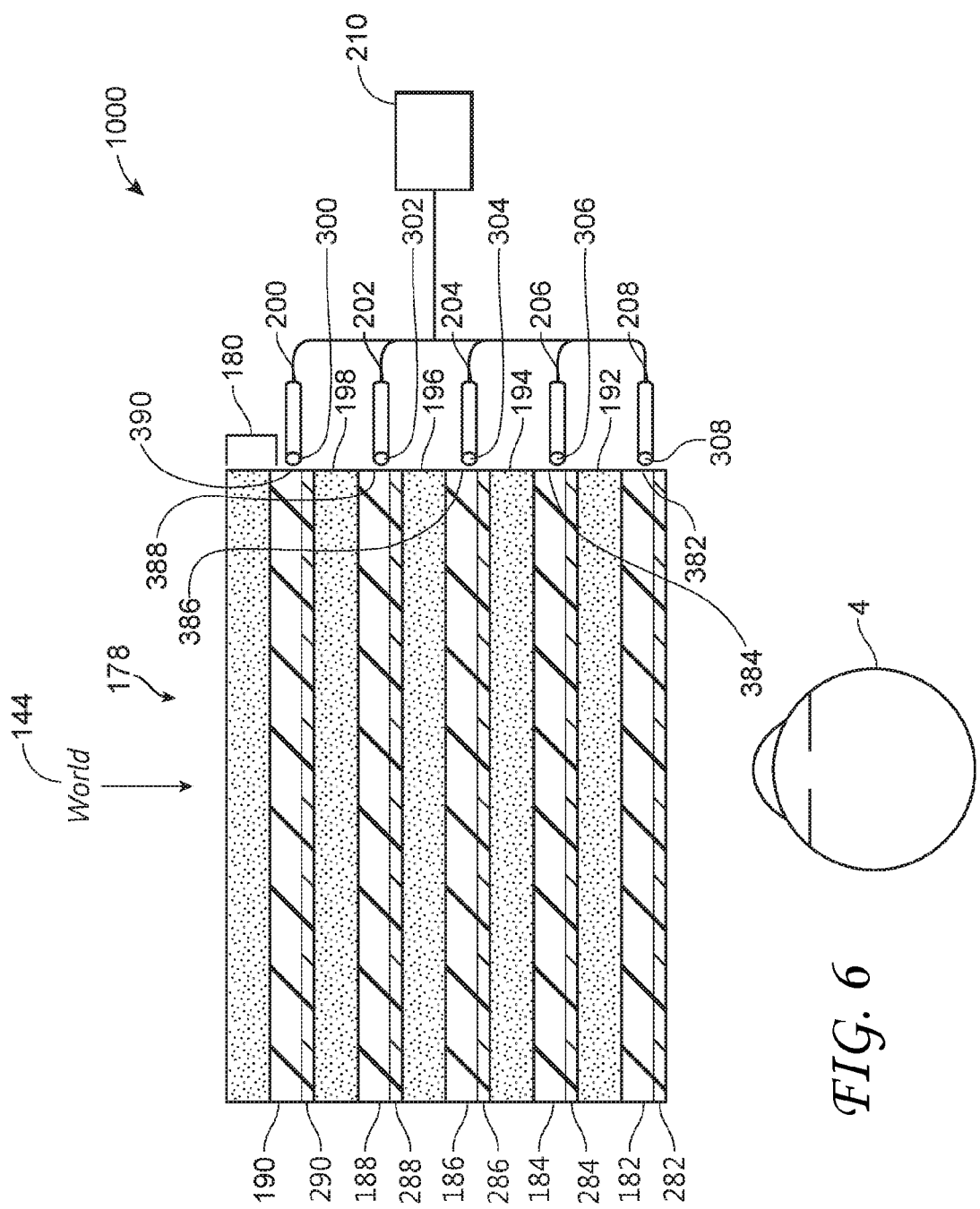
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 showing some parts of that system 80 in greater detail. For example, the waveguide assembly 178 may be part of the display 62 of FIG. 2.

With continued reference to FIG. 6, the waveguide assembly 178 may also include a plurality of features 198, 196, 194, 192 between the waveguides. In some embodiments, the features 198, 196, 194, 192 may be lens. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the input surfaces 382, 384, 386, 388, 390 may be an edge of a corresponding waveguide, or may be part of a major surface of the corresponding waveguide (that is, one of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the image injection devices 200, 202, 204, 206, 208 may be the output ends of a scanning fiber display system, in which the image injection devices 200, 202, 204, 206, 208 move or scan over the surface of the corresponding input surface 382, 384, 386, 388, 390 of the waveguides 182, 184, 186, 188, 190 to inject image information into those waveguides. An example of such a scanning fiber system is disclosed in U.S. application Ser. No. 14/641,376, which is incorporated by reference herein. In some embodiments, multiple ones of the image injection devices 200, 202, 204, 206, 208 may be replaced by a scanning fiber.

With continued reference to FIG. 6, a controller 210 controls the operation of the stacked waveguide assembly 178 and the image injection devices 200, 202, 204, 206, 208. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include one or more outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the one or more outcoupling optical elements light may also be referred to light extracting optical elements. An extracted beam of light is outputted by the waveguide at locations at which the light propagating in the waveguide strikes a light extracting optical element. Some or all of the one or more outcoupling optical elements 282, 284, 286, 288, 290 may, for example, can be one or more gratings, including diffractive optical features, as discussed further herein. While illustrated disposed at the bottom major surfaces of the waveguides 182, 184, 186, 188, 190 for ease of description and drawing clarity, in some embodiments, the one or more outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the one or more outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the one or more outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184. Other ways of producing these perceived colors may be possible.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings.

Both or one of the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the one or more outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of one or more outcoupling optical elements 282, 284, 286, 288, 290, which output light with a different amount of divergence depending on the associated depth plane. In some embodiments, the features 198, 196, 194, 192 may not be lenses; rather, they may simply be spacers (e.g., cladding layers and/or structures for forming air gaps).

In some embodiments, the one or more outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
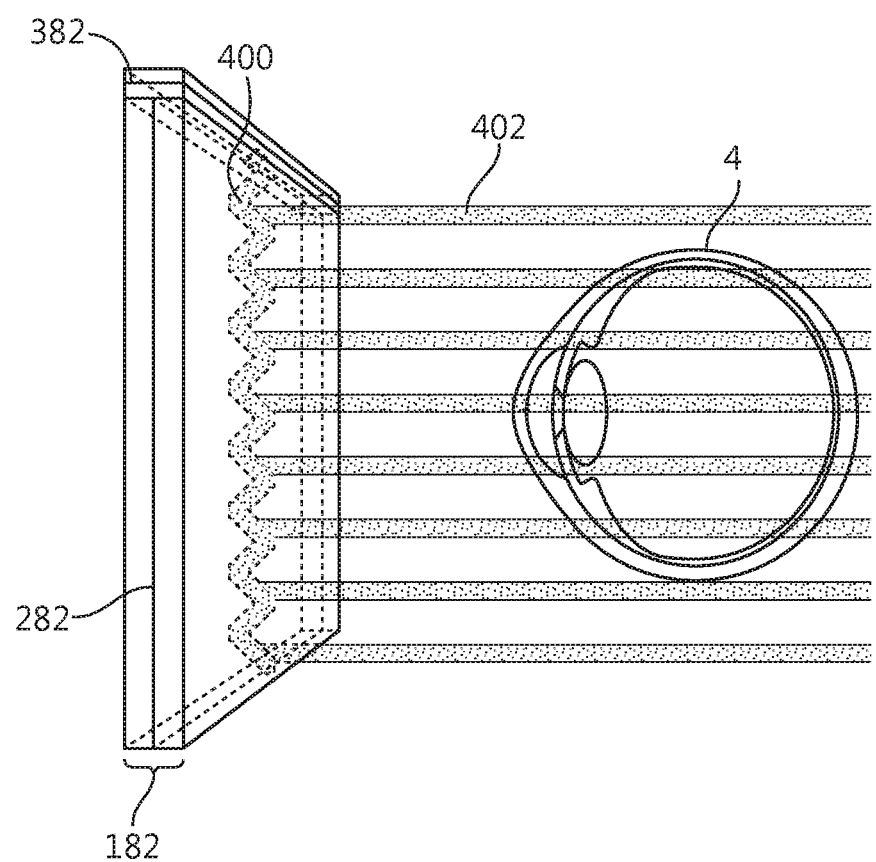
FIG. 7 shows an example of exit beams outputted by a waveguide.

FIG. 7 shows an example of exit beams outputted by a waveguide. One waveguide is illustrated, but it will be appreciated that other waveguides in the waveguide assembly 178 (FIG. 6) may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with one or more outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
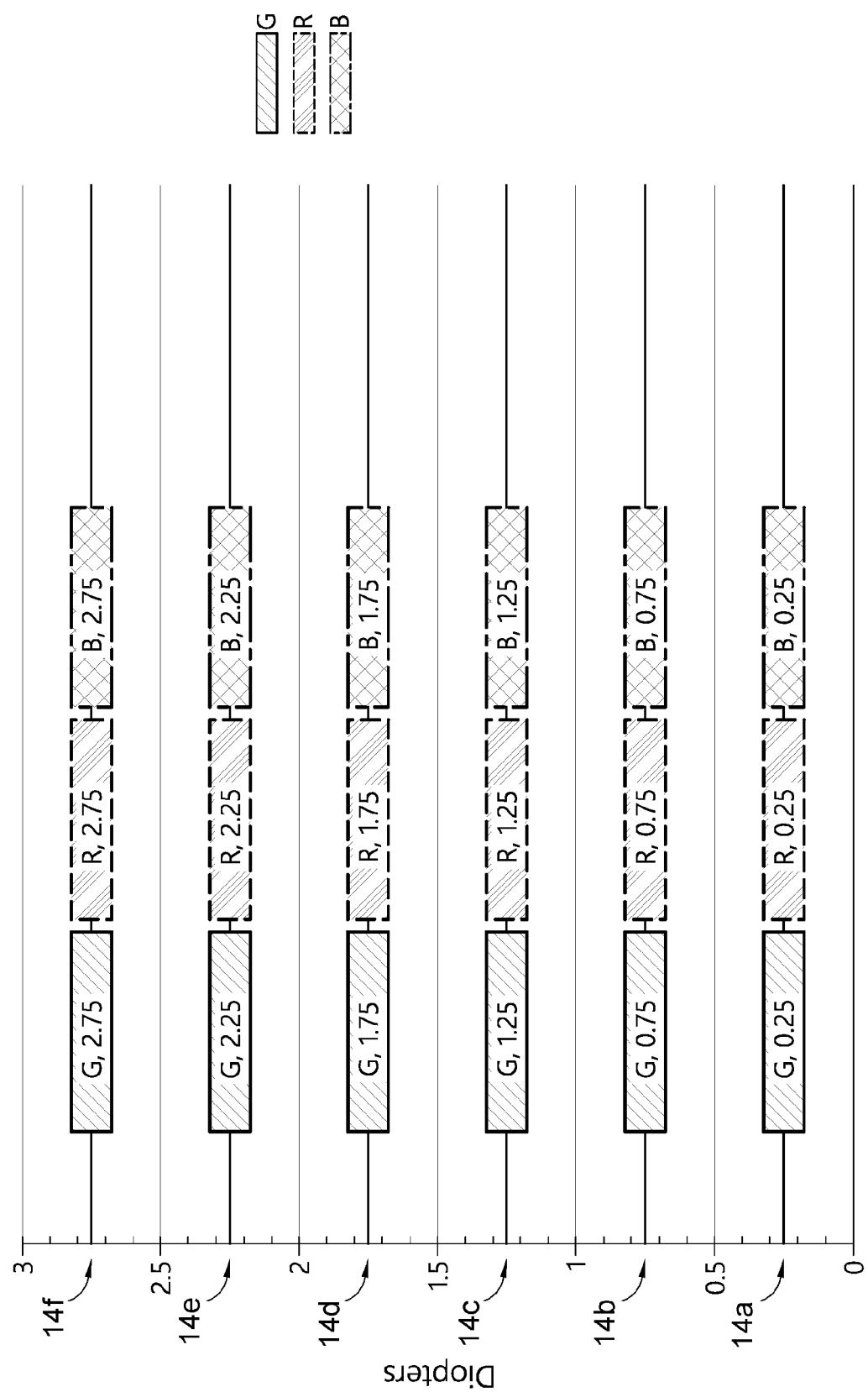
FIG. 8 illustrates an example of a stacked waveguide assembly in which each depth plane includes images formed using multiple different component colors.

FIG. 8 illustrates an example of a stacked waveguide assembly in which each depth plane includes images formed using multiple different component colors. In some embodiments, a full color image may be formed at each depth plane by overlaying images in each of the component colors, e.g., three or more component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters following the letters G, R, and B. Just as examples, the numbers following each of these letters indicate diopters (1/m), or inverse distance of the depth plane from a viewer, and each box in the figures represents an individual component color image.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

Figure 9A:
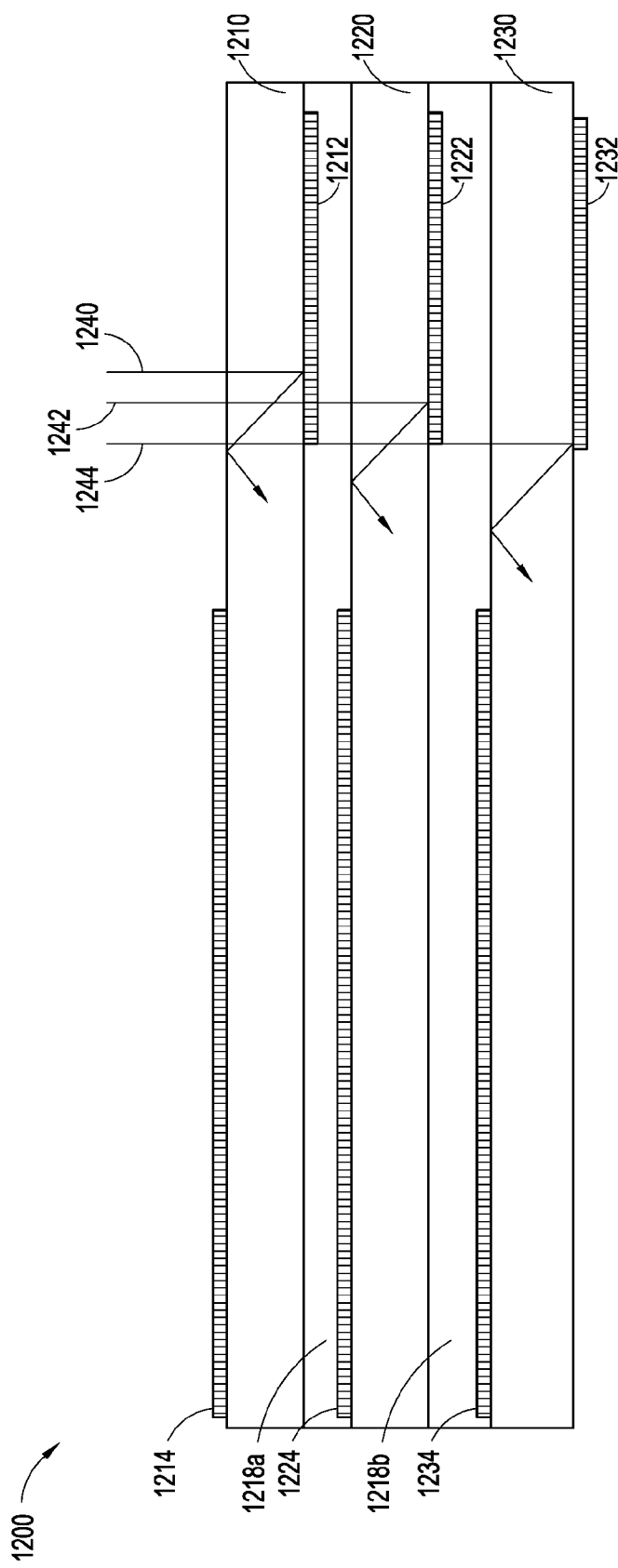
FIG. 9A illustrates an example of a cross-sectional side view of a set of stacked waveguides that each includes an incoupling optical element.

With reference now to FIG. 9A, in some embodiments, light impinging on a waveguide may need to be redirected in order to incouple that light into the waveguide. An incoupling optical element may be used to redirect and incouple the light into its corresponding waveguide. FIG. 9A illustrates an example of a cross-sectional side view of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element, with, e.g., incoupling optical element 1212 disposed on a major surface (e.g., a bottom major surface) of waveguide 1210, incoupling optical element 1224 disposed on a major surface (e.g., a bottom major surface) of waveguide 1220, and incoupling optical element 1232 disposed on a major surface (e.g., a bottom major surface) of waveguide 1230. In some embodiments, one or more of the incoupling optical elements 1212, 1222, 1232 may be disposed on the top major surface of the respective waveguide 1210, 1220, 1230 (particularly where the one or more incoupling optical elements are transmissive, deflecting optical elements). Preferably, the incoupling optical elements 1212, 1222, 1232 are disposed on the bottom major surface of their respective waveguide 1210, 1220, 1230 (or the top of the next lower waveguide), particularly where those incoupling optical elements are reflective, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by gas and/or solid layers of material. For example, as illustrated, layer 1218*a* may separate waveguides 1210 and 1220; and layer 1218*b* may separate waveguides 1220 and 1230. In some embodiments, the layers 1218*a* and 1218*b* are formed of low refractive index materials (that is, materials having a lower refractive index than the material forming the immediately adjacent one of waveguides 1210, 1220, 1230). Preferably, the refractive index of the material forming the layers 1218*a*, 1218*b* is 0.05 or more, or 0.10 or more less than the refractive index of the material forming the waveguides 1210, 1220, 1230. Advantageously, the lower refractive index layers 1218*a*, 1218*b* may function as cladding layers that facilitate total internal reflection (TIR) of light through the waveguides 1210, 1220, 1230 (e.g., TIR between the top and bottom major surfaces of each waveguide). In some embodiments, the layers 1218*a*, 1218*b* are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218*a*, 1218*b* are similar or the same. In some embodiments, the material forming the waveguides 1210, 1220, 1230 may be different between one or more waveguides, and/or the material forming the layers 1218*a*, 1218*b* may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

Preferably, the light rays 1240, 1242, 1244 have different properties, e.g., different wavelengths or different ranges of wavelengths, which may correspond to different colors. In some embodiments, the incoupling optical elements 1212, 122, 1232 each selectively deflect one or more particular wavelengths of light, while transmitting other wavelengths to an underlying waveguide and associated incoupling optical element.

For example, incoupling optical element 1212 may be configured to selectively deflect (e.g., reflect) ray 1240, which has a first wavelength or range of wavelengths, while transmitting rays 1242 and 1244, which have different second and third wavelengths or ranges of wavelengths, respectively. The transmitted ray 1242 then impinges on and is deflected by the incoupling optical element 1222, which is configured to selectively deflect (e.g., reflect) light of second wavelength or range of wavelengths. The ray 1244 is transmitted by the incoupling optical element 1222 and continues on to impinge on and be deflected by the incoupling optical element 1232, which is configured to selectively deflect (e.g., reflect) light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR.

With continued reference to FIG. 9A, the light rays 1240, 1242, 1244 propagate through the respective waveguide 1210, 1220, 1230 by TIR until impinging on the waveguide's corresponding light distributing elements 1214, 1224, 1234.

Figure 9B:
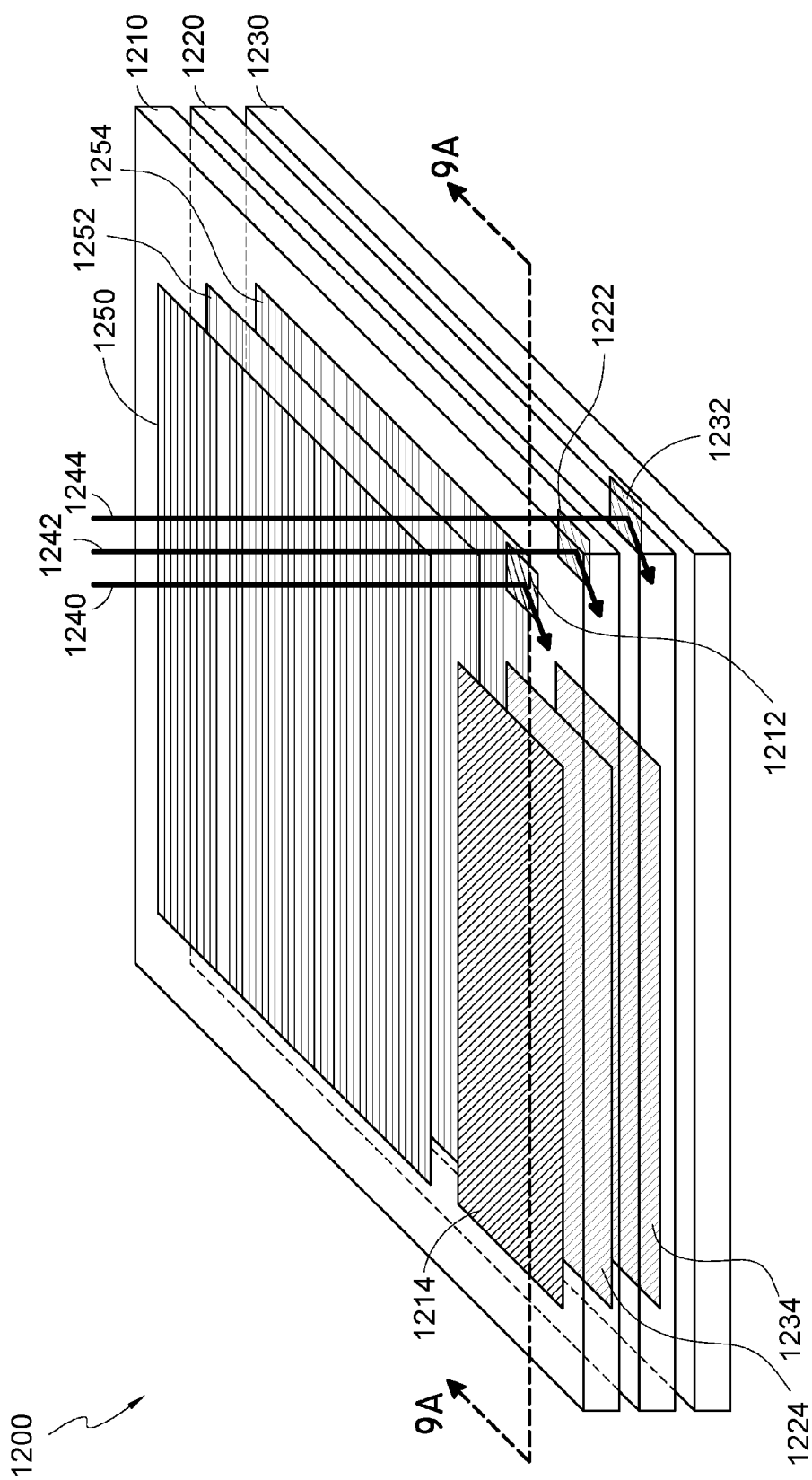
FIG. 9B illustrates an example of a perspective view of the plurality of stacked waveguides of FIG. 9A.

With reference now to FIG. 9B, an example of a perspective view of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively, in some embodiments. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect the desired color into its appropriate waveguide, while transmitting light of other colors. The light then propagates at an angle which will result in TIR within the respective waveguide 1210, 1220, 1230. In the example shown, light ray 1242 (e.g., green light) will reflect from the first incoupling optical element (e.g., color filter) 1212, and then continue to bounce down the waveguide, interacting with the light distributing element (e.g., OPE's) 1214 and then the outcoupling optical element (e.g., EPs) 1250, in a manner described earlier. The light rays 1242 and 1244 (e.g., blue and red light) will pass through the incoupling optical element (e.g., color filter) 1212 and into the next waveguide 1220. Light ray 1242 will reflect from the next incoupling optical element (e.g., color filter) 1222 and then bounce down the waveguide 1220 via TIR, proceeding on to its light distributing element (e.g., OPEs) 1224 and then the outcoupling optical element (e.g., EP's) 1252. Finally, light rays 1244 (e.g., red light) will pass through the incoupling optical element (e.g., color filter) 1232 and into its waveguide 1230, where it propagates to its light distributing element (e.g., OPEs) 1234 and then the outcoupling optical element (e.g., EPs) 1254, finally coupling out to the viewer, along with the light from the other waveguides 1210, 1220.

Metasurfaces

Figure 10B:
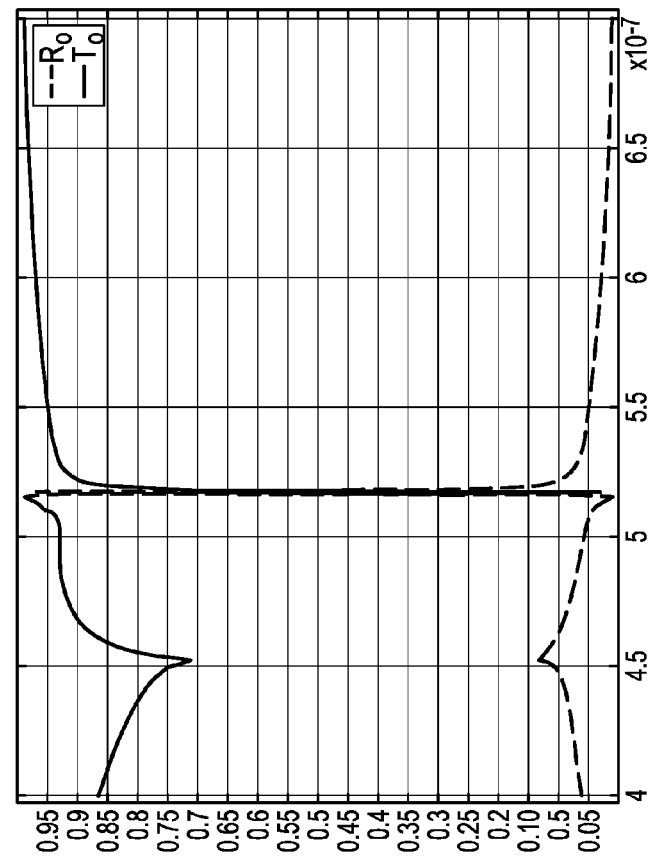
FIG. 10B shows a plot of the transmission and reflection spectrum for a metasurface having the general structure shown in FIG. 10A.
Figure 10A:
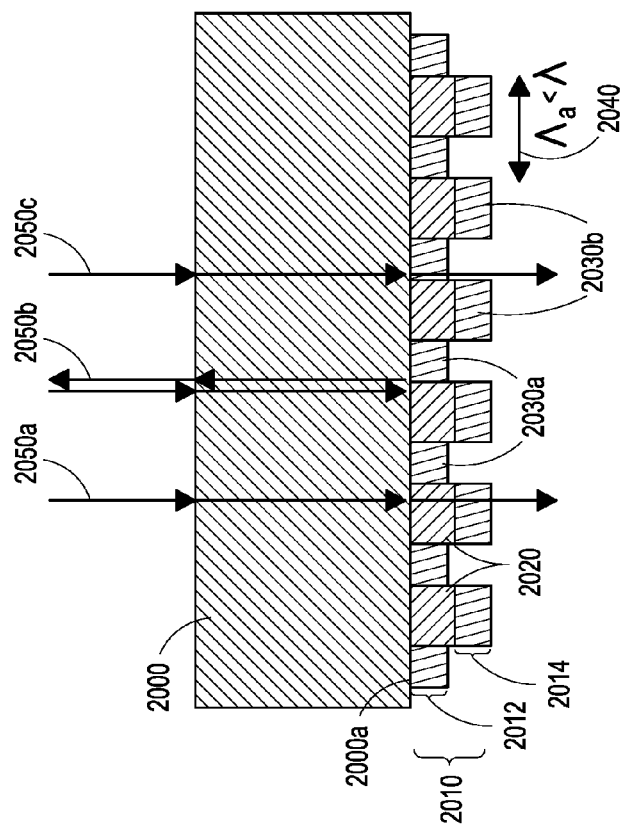
FIG. 10A illustrates an example of a cross-sectional side views of a metasurface.

FIG. 10A illustrates an example of a metasurface according to some embodiments. A substrate 2000 has a surface 2000a on which a metasurface 2010 is deposed. The metasurface 2010 includes a plurality of levels of optically transmissive materials. As illustrated, in some embodiments, the metasurface is a bi-level structure having first and second levels 2012, 2014, respectively. The first level 2012 includes a plurality of protrusions 2020 formed of a first optically transissive material and masses 2030a of a second optically transmissive material between the protrusions. The second level 2014 is on the protrusions (spaced away and separated from the substrate by the first level) and includes second level masses 2030b of the second optically transmissive material formed on the protrusions 2020. The protrusions 2020 may be ridges (or nanowires), which are laterally elongated into and out of the page and define trenches between neighboring protrusions. As illustrated, on the second level 2014, the masses 2030b of the second optically transmissive material may be localized on the surface of the protrusions 2020, forming plateaus of material spaced apart from other localized deposits (or plateaus) of the second optically transmissive material.

Preferably, the refractive index of the second optically transmissive material forming the masses 2030a, 2030b is higher than the refractive index of both the first optically transissive material forming the protrusions 2020 and of the material forming the substrate 2000. In some embodiments, the refractive index of the first optically transissive material is lower than or similar to the refractive index of the material forming the substrate 2000. It will be appreciated that the substrate 2000 may be a waveguide, and may correspond to the waveguides 182, 184, 186, 188, 190 (FIG. 6) and/or waveguides 1210, 1220, and 1230 (FIG. 9A). In such applications, the substrate preferably has a relative high refractive index, e.g., higher than 1.5, 1.6, 1.7, 1.8, or 1.9 which can provide benefits for increasing the field of view of a display outputting light from that substrate 2000 to form an image. In some embodiments, the substrate 2000 is formed of glass (e.g., doped glass), lithium niobate, plastic, a polymer, sapphire, or other optically transmissive material. Preferably, the glass, plastic, polymer, sapphire, or other optically transmissive material has a high refractive index, e.g., a refractive index higher than 1.5, 1.6, 1.7, 1.8, or 1.9).

With continued reference to FIG. 10A, the first optically transissive material of the protrusions 2020 is preferably a material that may be patterned, e.g., by lithography and etch processes. More preferably, the first optically transmissive material is a nanoimprint resist that may be patterned by nanoimprinting. As discussed herein, the second optically transmissive material forming the masses 2030a, 2030b has a higher refractive index than both the first optically transissive material of the protrusions 2020 and the material forming the substrate 2000. In some embodiments, the refractive index of the second optically transmissive material is higher than 1.6, 1.7, 1.8, or 1.9. Examples of materials for the second optically transmissive material include semiconductor materials, including silicon-containing materials, and oxides. Examples of silicon-containing materials include silicon nitride and silicon carbide. Examples of oxides include titanium oxide, zirconium oxide, and zinc oxide. In some embodiments, the second optically transmissive material may have lower optical transparency. For example, the second optically transmissive material may be silicon or its derivatives. In some embodiments, the first and second optically transmissive materials 2020, 2030 are amorphous solid state materials, or crystalline solid state materials. Without being limited by theory, amorphous materials may be desirable in some applications, since they may be formed at lower temperatures and over a wider range of surfaces than some crystalline materials. In some embodiments, each of the first and second optically transmissive materials forming the features 2020, 2030a, 2030b may be one of an amorphous or crystalline semiconductor material.

With continued reference to FIG. 10A, the protrusions have a pitch 2040. As used herein, pitch refers to the distance between similar points on two immediately neighboring structures. It will be appreciated that the similar points are similar in that they are at similar parts (e.g., a left or right edge) of structures that are substantially identical. For example, the pitch of the protrusions 2020 is equal to the total width defined by a protrusion 2020 and the immediately neighboring separation between that protrusion and an immediately neighboring similar protrusion 2020. Stated another way, the pitch may be understood to be the width of repeating units (e.g., the sum of the width of a protrusion 2020 and a mass 2030a) of the array of features formed by those protrusions 2020.

As illustrated, light of different wavelengths (corresponding to different colors) may impinge on the metasurface and, as discussed herein, the metasurface is highly selective in redirecting light of specific wavelengths. This selectivity may be achieved based upon the pitch and physical parameters of the features of the first and second levels 2012, 2014, as discussed herein. The pitch of the protrusions 2020 is less than the wavelength of light desired for light redirection of zero order reflection, in some embodiments. In some embodiments, the geometric size and periodicity increases as wavelengths become longer, and the height or thickness of one or both of the protrusions 2020 and masses 2030a, 2030b also increase as wavelengths become longer. The illustrated light rays 2050a, 2050b, and 2050c correspond to light of different wavelengths and colors in some embodiments. In the illustrated embodiment, the metasurface has a pitch that causes light ray 2050b to be reflected, while the light rays 2050a and 2050c propagate through the substrate 2000 and the metasurface 2010.

Advantageously, the multi-level metasurface is highly selective for particular wavelengths of light. FIG. 10B shows a plot of the transmission and reflection spectrum for a metasurface having the general structure shown in FIG. 10A. In this example, the protrusions 2020 have a width of 125 nm, a thickness of 25 nm, and are formed of resist; the masses of material 2030a and 2030b have a thickness of 75 nm and are formed of silicon nitride; the pitch is 340 nm; and air gaps separate the masses 2030b. The horizontal axis indicates wavelength and the horizontal axis indicates transmission (on a scale of 0-1.00, from no reflection to complete reflection). Notably, a sharp peak in reflection (at 517 nm), and a concomitant reduction in transmission, is seen for a narrow band of wavelengths while other wavelengths are transmitted. Light is reflected when the wavelength is matched with the resonant wavelength (about 517 nm in this example). The protrusions 2020 and overlying structures 2030 are arranged with subwavelength spacing, and there is only zero order reflection and transmission. As shown in FIG. 10B, the reflection spectrum shows a sharp peak across the visible wavelength region, which is a signature of optical resonance.

Figure 11A:
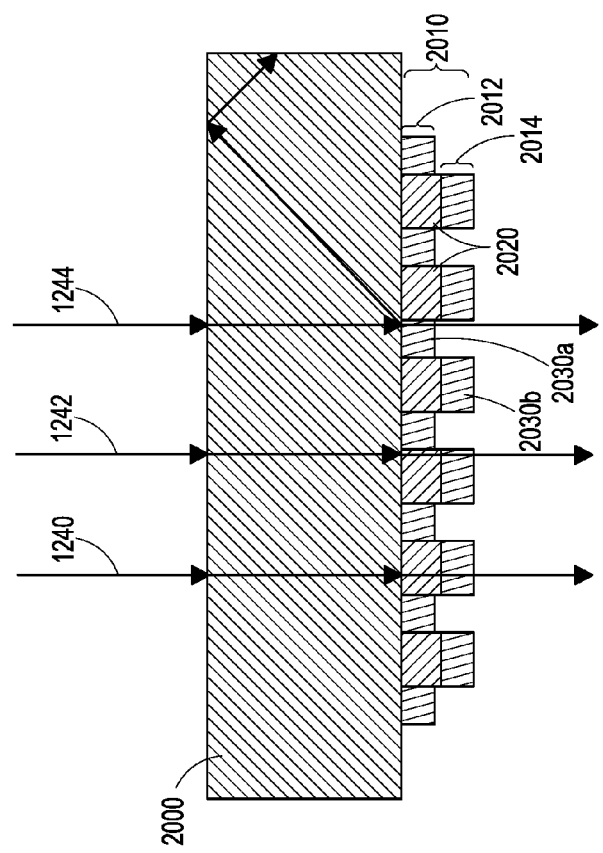
FIGS. 11A-11B show examples of cross-sectional side views of metasurfaces incoupling light into waveguides.
Figure 11B:
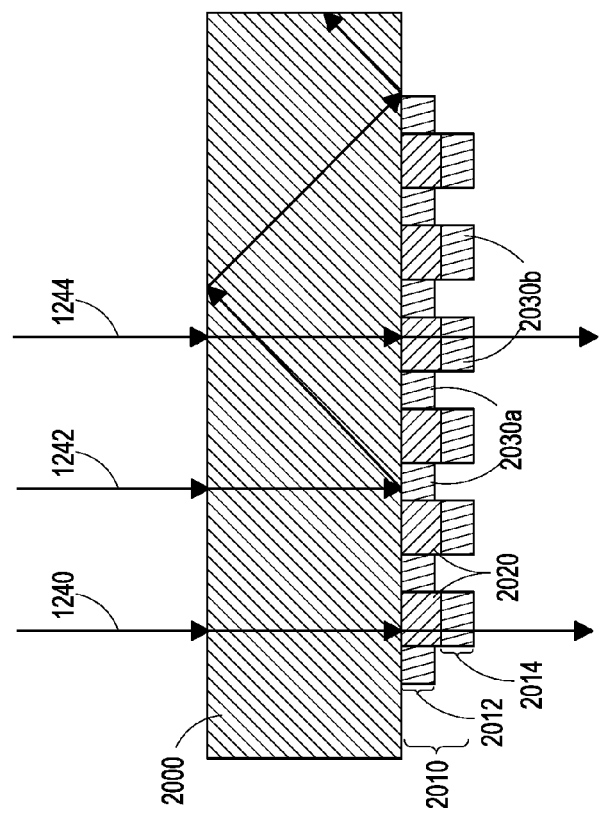

It will be appreciated that the pitch of the metasurface structures (e.g., the pitch of the protrusions 2020 and overlying structures 2030) may be altered to change the light redirecting properties of the metasurface. For example, when the pitch is larger, light at resonant wavelengths will be diffracted (or deflected at a non-normal angle, e.g., less than 90 degrees relative to the surface of the substrate 2000) upon incidence on the metasurface 2010. In some embodiments, where the substrate 2000 is a waveguide, the pitch of the metasurface structures may be selected so that light at the resonant wavelength is deflected at such an angle that it propagates through the waveguide by total internal reflection (TIR), while other wavelength and color will be transmitted through the metasurface 2010. In such arrangements, the metasurface 2010 is an incoupling optical element and may be said to incouple the deflected light. FIGS. 11A-11B show examples of cross-sectional side views of metasurfaces incoupling light into waveguides.

FIG. 11A shows light of one wavelength being incoupled, while FIG. 11B shows light of a different wavelength being incoupled. The resonant wavelength of the metasurface 2010 can be engineered by changing the geometric sizes of its constituent structures. For example, a metasurface that is resonant at the wavelength of red color light has a larger geometric size and periodicity (FIG. 11B) than a metasurface that is resonant at the wavelength of green color light (FIG. 11A). In some embodiments, the pitch of the protrusions 2020 is about 10 nm-1 µm, 10-600 nm, about 200-500 nm, or about 300-500 nm, and the height of each level is about 10 nm-1 µm, about 10-500 nm, about 50-500 nm, or about 100-500 nm. In some embodiments, the height of the second level 2014 is different from that of the first level. For example, the height of the second level 2014 may be about 10 nm-1 µm or about 10-300 nm, and the height of the first level may be about 10 nm-1 µm, 10-500 nm. In some embodiments, the metasurface 2010 may form one or more of the incoupling optical elements 1212, 1222, 1232 (FIG. 9A) and may receive light rays 1240, 1242, 1244 as illustrated.

It will be appreciated that the metasurface 2010 will also deflect light impinging on it from within the light guide 2000. Taking advantage of this functionality, in some embodiments, the metasurfaces disclosed herein may be applied to form outcoupling optical elements. FIGS. 12A-12B show examples of cross-sectional side views of metasurfaces outcoupling light from waveguides. FIG. 12A shows the outcoupling of light of one wavelength, while FIG. 12B shows the outcoupling of light of a different wavelength. As disclosed herein, the resonant wavelength of the metasurface 2010 can be engineered by changing the geometric sizes of its constituent structures, thereby providing wavelength selectivity. As an example, a larger geometric size and periodicity (FIG. 12B) may be used to provide a metasurface resonant at the wavelength of red color light, while a relatively smaller geometric size and periodicity may be used to provide a metasurface that is resonant at the wavelength of green color light (FIG. 12A). In some embodiments, the metasurface 2010 may form one or more of the outcoupling optical elements 282, 284, 286, 288, 290 (FIG. 6) or 1250, 1252, 1254 (FIG. 9B) instead of, or in addition to, forming an incoupling optical element. Where different waveguides have different associated component colors, it will be appreciated that the outcoupling optical elements and/or the incoupling optical elements associated with each waveguide made have a geometric size and/or periodicity specific for the wavelengths or colors of light that the waveguide is configured to propagate. Thus, different waveguides may have metasurfaces with different geometric sizes and/or periodicities. As examples, the metasurfaces for incoupling or outcoupling red, green, or blue light may be have geometric sizes and/or periodicities (pitches) configured to redirect or diffract light at wavelengths of 638 nm, 520 nm, and 455 nm, respectively.

In some embodiments, the metasurfaces 2010 may have geometric sizes and/or pitches that cause the metasurfaces to impart optical power onto the diffracted light. For example, the metasurfaces may be configured to cause light to exit the metasurface in diverging or converging directions. Different portions of the metasurface may have different pitches, which cause different light rays to deflect in different directions, e.g., so that the light rays diverge or converge.

In some other embodiments, the metasurface may deflect light such that the light propagates away from the metasurface as collimated rays of light. For example, where colliminated light impinges on the metasurface at similar angles, the metasurface may have consistent geometric sizes and a consistent pitch across the entirety of the metasurface to deflect the light at similar angles.

With reference to FIGS. 11A-12B, as illustrated, the metasurface 2010 may deflect light in a "reflective mode" where the deflected light remains on the same side of the metasurface before and after impinging on the metasurface, while light of wavelengths that are not reflected are transmitted across the thickness of the metasurface. In some embodiments, the metasurface may deflect light in a "transmissive mode" in which both deflected and non-deflected light are transmitted across the thickness of the metasurface, with the path of the deflected light being different after exiting the metasurface, while the path of the non-deflected light is substantially unchanged. It will be appreciated that the metasurface may have both transmissive and reflective functionality, e.g., in some embodiments, the metasurface may reflect a portion of incident light, while transmitting and deflecting another portion of that light.

FIGS. 13A-13B show examples of a metasurface 2010 operating in a transmissive mode. With reference to FIG. 13A, light rays 1240, 1244 propagate through the metasurface substantially without being deflected, while light ray 1242 is deflected. The light ray 1242 may be at the resonant wavelength for the metasurface 2010, while the light rays 1240, 1244 are not. In some embodiments, the deflection may be used to incouple or outcouple light ray 1240. FIG. 13B shows examples of metasurfaces configured to operate in a transmissive mode for light incoupling. In some embodiments, as illustrated, light rays 1240, 1242, 1244 each have different wavelengths (e.g., corresponding to different colors) and metasurfaces 1212, 1222, 1232 are each selective for deflecting a particular wavelength or range of wavelengths. For example, metasurface 1212 may selectively deflect light ray 1240 in the transmissive mode, while transmitting light rays 1242 and 1244 without deflection. Similarly, as illustrated, metasurface 1222 may selectively deflect light ray 1242 in the transmissive mode, while transmitting light ray 1244 without deflection; and metasurface 1232 may selectively deflect light ray 1244 in the transmissive mode. In some other embodiments, the transmissive mode metasurfaces may also be applied as outcoupling optical elements, such as one or more of the outcoupling optical elements 282, 284, 286, 288, 290 (FIG. 6) or 1250, 1252, 1254 (FIG. 9B).

Metasurfaces that function in a transmissive mode may provide advantages in some applications, such as where they are utilized on a waveguide with other transmissive optical elements (such as some embodiments of the light distributing elements 1214, 1224, 1234 and/or outcoupling optical elements 1250, 1252, 1254 of FIG. 9B). Such transmssive mode metasurfaces may be formed on the same side of a substrate as the other optical elements, which can have advantages for facilitating the fabrication of the metasurfaces and optical elements, while reducing the likelihood of damaging the metasurfaces or optical elements (as may occur if processing on two sides of the substrate is required).

Figure 14A:
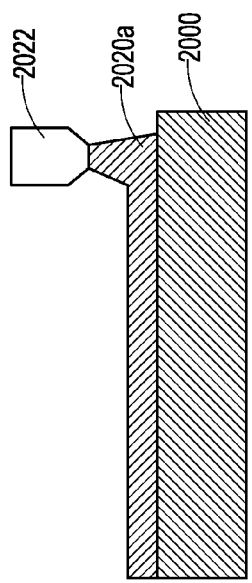
FIGS. 14A-14D illustrate an example of a process flow for forming a metasurface.

FIGS. 14A-14D illustrate an example of a process flow for forming the metasurface 2010. With reference to FIG. 14A, a first material 2020a, e.g., resist (such as a nanoimoprint resist) is deposited on substrate 2000. The resist 2020a is preferably optically transmissive and may be deposited by, e.g., spin coating, to form a layer of resist. In some embodiments, the resist 2020a may be deposited by jet coating (e.g., inkjet printing), which may provide advantages for forming exceptionally thin layers, and also layers with varying composition and/or thickness. As illustrated, the resist 2020a may be delivered to the substrate 2000 from a resist source 2022.

Figure 14B:
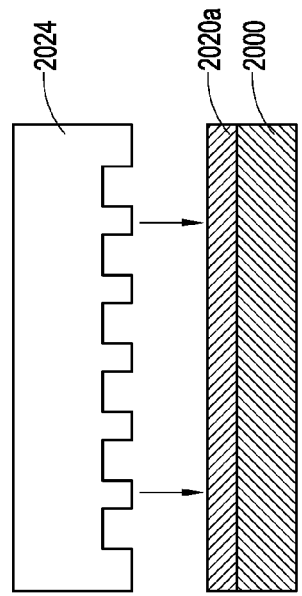

With reference to FIG. 14B, an imprint template or master 2024 is brought into contact with the resist 2020a to pattern that resist. It will be appreciated that the pattern in the imprint template 2024 may be formed by, e.g., lithography, including e-beam lithography or EUV lithography. However, the same template may be reused to pattern resist on multiple substrates, thereby reducing per-unit fabrication costs for the eventually-formed metasurfaces.

Figure 14C:
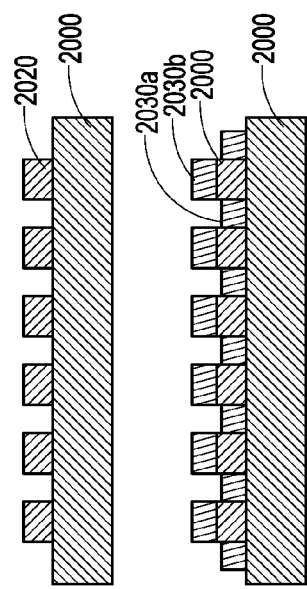

After contacting the imprint template 2024, the resist 2020a assumes the pattern defined by the openings in the template 2024. In some embodiments, the resist 2020a may be cured, e.g., by exposure to light (such as UV light) and/or heat, to immobilize the resist. The template 2024 may then be retracted, to leave a patterned resist 2020, as shown in FIG. 14C.

Figure 14D:
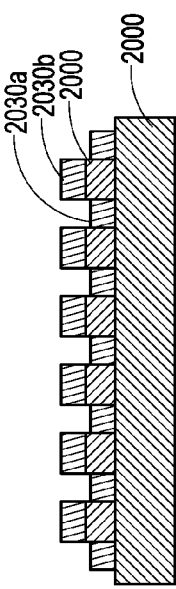

With reference to FIG. 14D, second material 2030 is subsequently deposited on the patterned resist 2020. Examples of materials for the second material 2030 include semiconductor materials, including silicon-containing materials such as silicon, silicon nitride, silicon carbide; oxides, including zirconium oxide, zinc oxide, and titanium oxide; and optically transmissive resists. As disclosed herein, the second material 2030 is preferably an optically transmissive material. The second material 2030 may be deposited by various processes, including blanket depositions, directional depositions, and spin or jet coating. Examples of blanket depositions include chemical vapor deposition (CVD), in which the resist is exposed to mutually reactive precursors simultaneously present in a deposition chamber containing the substrate 2000, and atomic layer deposition (ALD), in which the resist is alternately exposed to precursors. ALD may provide advantages for precisely controlling the thickness of deposited layers, where high precision is desired, and also form depositing materials at low temperatures. Examples of directional depositions include evaporation and sputtering to deliver the second material to the nanoimprinted resist 2020 and substrate 2000.

Figure 15:
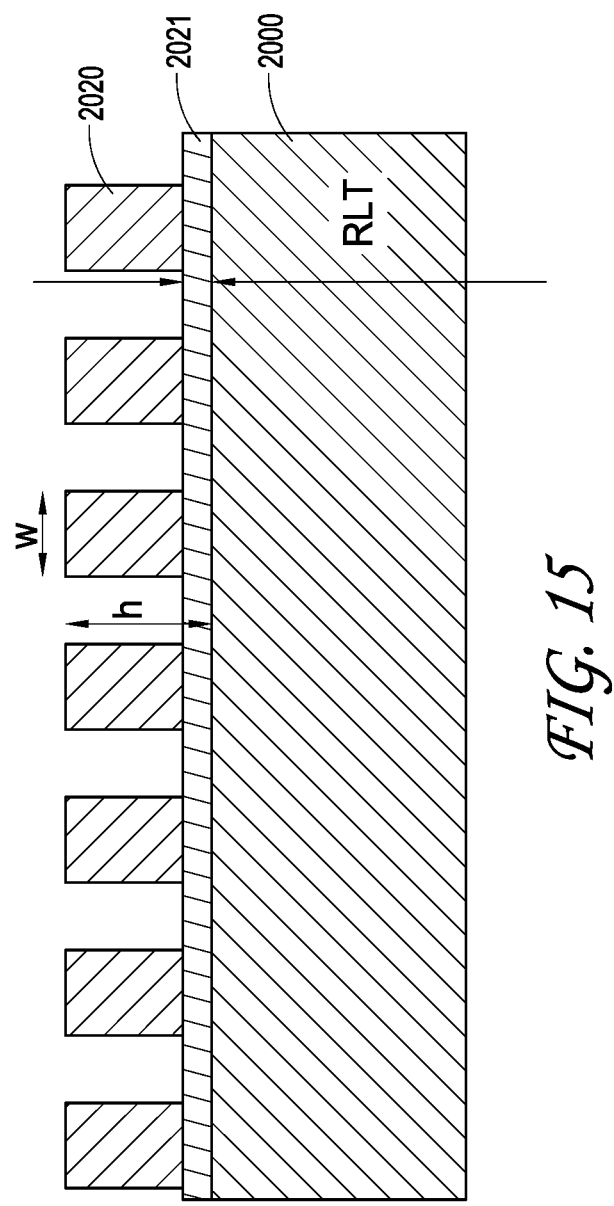
FIG. 15 illustrates a close-up cross-sectional view of patterned material on the first level of a metasurface.

With reference now to FIG. 15, a close-up cross-sectional view of patterned material 2020 on the first level of a metasurface is shown. As illustrated, the patterned layer of material may have a residual layer thickness (RLT) 2021 that remains unpatterned. Such a residual layer thickness is typical in nanoimprinting and may be present (while not illustrated) in various embodiments herein. Where the protrusions 2020 are formed of imprinted resist, it will be appreciated that the resist may be sensitive to high temperatures. Preferably, the deposition temperature for the second level material 2030 is within 30-50 degrees Celsius of the glass transition temperature (Tg) of the resist. More preferably, the deposition temperature is below Tg. In some embodiments, the aspect ratio (AR, h:w) of each protrusion less than about 3 to 4 (e.g., AR<3-4). In some embodiments, the aspect ratio is about 1. In some embodiments, the refractive index of the resist is between about 1.2-2.0.

With reference now to FIGS. 16A1-16C, it will be appreciated that the various methods for depositing the second material 2030 may be utilized to provide different profiles for the metasurface 2010, by providing the second material 2030 at different locations, including different levels, relative to the protrusions 2030. FIGS. 16A1 and 16B-16C illustrate examples of cross-sectional side views of metasurface structures in which the second material is deposited to different thicknesses over the underlying pattern of protrusions. In FIG. 16A1, the metasurface 2010 is defined by a bilevel structure with an air gap between protrusions 2020 and masses 2030a and 2030b of the second material deposited on the protrusions. It will be appreciated that, where the deposition is a directional deposition process, the second material is substantially localized on the top surface of the protrusions and in the space between the protrusions 2020, with no or minimal material on the sides of the protrusions. Where the deposition is a conformal, blanket deposition, the second material 2030 is deposited on top of, between, and on the sides of the protrusions 2020. FIG. 16A1 illustrates some of the second material on the sides of the protrusions 2020, although this material 2030 on the sides is not necessarily to scale. In some embodiments, the material 2030 forms a blanket layer having a substantially constant thickness over all surfaces, including the sidewalls of the protrusions 2020. As discussed herein, such a blanket layer may be deposited by, e.g., ALD.

FIG. 16A2 shows a plot of the transmission and reflection spectrum for a metasurface having the general structure shown in FIG. 16A1. The horizontal axis indicates angle of incidence of light and the horizontal axis indicates transmission (on a scale of 0-1). In this example, the protrusions 2020 are formed of resist and have a thickness of 100 nm and a width of 130 nm; the overlying material 2030 is a conformal blanket layer of silicon nitride having a substantially constant thickness of 60 nm; the pitch is 382 nm; and an air gaps separate the masses 2030b. As seen in FIG. 16A2, the metasurface has an advantageously wide range over incident angles over which it reflects light. For example, the metasurface is highly reflective of light having angles of about ±0.25 rad relative to the normal to the metasurface (e.g. relative to the thickness axis of the metasurface).

FIG. 16B illustrates a metasurface defined by a bilevel structure with no air gaps between protrusions 2020. The second material has been deposited to such an extent that the gaps between the protrusions 202 has been completely filled by the masses 2030a. The deposition for achieving the illustrated is a directional deposition, although a conformal, blanket deposition would achieve a similar structure (with some broadening of the plateaus formed by the material 2030 on the upper level of the metasurface structure).

FIG. 16C illustrates a metasurface defined by a bilevel structure with a thick continuous upper level layer 2030b. In some embodiments, such as layer 2030b may be achieved using a conformal, blanket deposition that completely fills the gaps between protrusions 2020 and then continues to such an extent that the mass 2030b forms a continuous layer over the protrusions 2020.

FIGS. 17A-17C illustrate examples of cross-sectional side views of metasurface structures in which the second material is a resist deposited by spin or jet coating. Preferably, the resist is a high refractive index resist with a refractive index higher than 1.6, 1.7, 1.8, or 1.9. Advantageously, changing the viscosity of the resist and coating conditions allows different structures to be created. In FIG. 17A, the resist is deposited on the protrusions 2020 but has a low enough viscosity that it settles into the gaps between the protrusions, thereby forming a metasurface with masses 2030a and no residual top layer. In FIG. 16B, a sufficient quantity of the resist is deposited that the gaps between the protrusions 2020 are filled by masses 2030a of the resist, while no residual top layer is present. In FIG. 16C, a sufficient quantity of the resist is deposited that the gaps between the protrusions 2020 are filled by the masses 2030a, while also forming a continuous residual top layer formed by the mass 2030b.

While taking the form of bi-level structures in some embodiments, it will be appreciated that the metasurfaces disclosed herein may include more than two levels. For example, the metasurfaces may include three or more levels. These three or higher level structures may be formed using stepped protrusions. The lower levels (closest to the substrate) may include portions of protrusions formed of the first optically transmissive material and masses of the second optically transmissive material at sides of the protrusions, and the highest level (farthest from the substrate) preferably contains only the second optically transmissive material, deposited on the top surface of the highest step of the protrusions. Preferably, to form a metasurface of n levels, a stepped protrusion of n−1 levels is utilized, with the step on each successively level having a smaller width than the step on the immediately lower level. In some embodiments, the steps, as seen in a cross-sectional side view taken transverse to the elongate axis of the protrusions, are symmetrical about an axis extending a height of the protrusions. It is contemplated that these three or higher level metasurfaces may be applied in the same applications (e.g., as incoupling and/or outcoupling optical elements) as bi-level metasurfaces.

FIGS. 18A-18B illustrate examples of cross-sectional side views of metasurfaces having more than two levels. FIG. 18A illustrates a metasurface 2010 having first, second, and third levels, 2012, 2014, and 2016, respectively. The tri-level metasurface 2010 is formed using stepped protrusions 2020, each of which extends over two levels, with one step on each level, and the width of the step on the second level less than the width of the step on the first level. Masses 2030a of the second optically transmissive material are formed at the sides of the protrusions 2020 on the first level 2012, and preferably extend continuously from one protrusion 2020 to an immediately neighboring protrusion 2020. Masses 2030b of the second optically transmissive material are formed at the sides of the protrusions 2020 on the second level 2014. On the third level, masses 2030c of the second optically transmissive material are formed on a top surface of the protrusions 2020. As illustrated, the amount of the second optically transmissive material that is deposited, in conjunction with the heights of the steps of the protrusions 2020, are such that the second optically transmissive material does not have a thickness that occupies the entire height of a given level. In a sense, an air gap is present on a given level in the space between immediately neighboring protrusions 2020.

FIG. 18B illustrates a metasurface similar to the metasuface of FIG. 18A, except that the sides of the protrusions are not exposed. It will be appreciated that the sides of the protrusions 2020 may be covered by depositing sufficient amounts of the second optically transmissive material to completely fill in the space between immediately neighboring protrusions 2020 on each level.

FIGS. 19A-19D illustrate an example of a process flow for forming metasurfaces having more than two levels. In some embodiments, the process flow may proceed using similar processes as the process flow of FIGS. 14A-14D, with the exception that the imprint template 2026 is a multilevel structure, configured for imprinting multi-level protrusions. Such a multilevel imprint template 2026 may be formed by, e.g., multi-exposure lithography, including multi-exposure e-beam lithography or multi-exposure EUV lithography. In some embodiments, each exposure may be used to pattern on step or level of the negative for the multi-level protrusions.

Briefly, with reference to FIG. 19A, a first material 2020a, e.g., resist (such as a nanoimprint resist) is deposited on substrate 2000. The resist 2020a is preferably optically transmissive and may be deposited as discussed above regarding FIG. 14A.

With reference to FIG. 19B, the imprint template or master 2026 is brought into contact with the resist 2020a to pattern that resist. After contacting the imprint template 2026, the resist 2020a assumes a pattern containing stepped protrusions 2020. As noted herein, the resist may be cured to immobilize it, before retracting the template 2026. The resulting stepped, multi-level protrusions are shown in FIG. 19C.

With reference to FIG. 19D, a second material is subsequently deposited on the patterned resist. As noted herein, examples of materials for the second material include semiconductor materials, including silicon-containing materials such as silicon, silicon nitride, silicon carbide; oxides, including zirconium oxide, zinc oxide, and titanium oxide; and optically transmissive resists. The second material is preferably optically transmissive material. The second material may be deposited by various processes, including blanket depositions, directional depositions, and spin or jet coating, as discussed above regarding FIG. 14D.

While not illustrated, it will be appreciated that with appropriate selection of deposition processes, deposition times, and/or deposition conditions, the physical structure of the metasurface may be changed as illustrated in FIGS. 16A1 and 16B-17C. The depositions noted with respect to any of those FIGS. 16A1 and 16B-17C may be applied to a three or higher level metasurface. For example, the presence of an air-gap between protrusions 2020 may be achieved by a deposition that does not reach the full height of a particular level. Alternatively, enough of the second optically transmissive material may be deposited to completely fill all levels of the metal surface, such that a continuous layer of the second material extends over a top of the protrusions 2020.

In some embodiments, waveguides 2000 having the metasurface 2010 (as incoupling and/or outcoupling optical elements) may be used to form display systems, such as the system 1000 (FIG. 6) disclosed herein. For example, after fabrication of the metasurface 2010, the waveguide 2000 may be optically coupled to a light pipe, such as a light pipe for injecting image information into the waveguide. The light pipe may be an optical fiber in some embodiments. Examples of light pipes include the image injection devices 200, 202, 204, 206, 208 (FIG. 6) and scanning optical fibers. In some embodiments, a plurality of waveguides each having metasurfaces 2010 may be provided, and each of these waveguides may be optically coupled to one or more image injection devices.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

For example, while advantageously utilized with AR displays that provide images across multiple depth planes, the augmented reality content disclosed herein may also be displayed by systems that provide images on a single depth plane. Moreover, while illustrated as being on a single surface of a substrate, it will be appreciated that the metasurfaces may be disposed on multiple substrate surfaces (e.g., on opposing major surfaces of a waveguide). In some embodiments where multiplexed image information (e.g. light of different colors) is directed into a waveguide, multiple metasurfaces may be provided on the waveguide, e.g., one metasurface active for each color of light. In some embodiments, the pitch or periodicity, and/or geometric sizes, of the protrusions forming the metasurface may vary across a metasurface. Such a metasurface may be active in redirecting light of different wavelengths, depending upon the geometries and pitches at the locations where that light impinges on the metasurfaces. In some other embodiments, the geometries and pitches of metasurface features are configured to vary such that deflected light rays, even of similar wavelengths, propagate away from the metasurface at different angles. It will also be appreciated that multiple separated metasurfaces may be disposed across a substrate surface, with each of the metsurfaces having the same geometries and pitches in some embodiments, or with at least some of the metasurfaces having different geometries and/or pitches from other metasurfaces in some other embodiments.

Also, while advantageously applied to displays, such as wearable displays, the metasurfaces may be applied to various other devices in which a compact, low-profile light redirecting element is desired. For example, the metal surfaces may be applied to form light redirecting parts of optical plates (e.g., glass plates), optical fibers, microscopes, sensors, watches, cameras, and image projection devices generally.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

For ease of description, various words indicating the relative positions of features are used herein. For example, various features may be described as being "on," "over," at the "side" of, "higher" or "lower" other features. Other words of relative position may also be used. All such words of relative position assume that the aggregate structure or system formed by the features as a whole is in a certain orientation as a point of reference for description purposes, but it will be appreciated that, in use, the structure may be positioned sideways, flipped, or in any number of other orientations.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

We claim:

1. A display system comprising:
   a waveguide;
   a light incoupling optical element disposed on a surface of the waveguide and configured to incouple light into the waveguide, the light incoupling optical element comprising:
      a multilevel metasurface comprising:
         a plurality of spaced apart protrusions having a pitch and formed of a first optically transmissive material, wherein the first optically transmissive material comprises a resist; and
         a second optically transmissive material over and between the spaced apart protrusions,
   wherein the waveguide is one of a stack of waveguides, wherein each of the stack of waveguides comprises an associated multilevel metasurface.

2. The display system of claim 1, further comprising:
   an image injection device configured to inject light comprising image information into the waveguide.

3. The display system of claim 1, wherein the pitch of the protrusions varies across the surface of the waveguide.

4. The display system of claim 1, further comprising an image injection device configured to inject light comprising image information into the waveguide.

5. The display system of claim 1, wherein the associated multilevel metasurfaces of at least some of the waveguides are configured to redirect light of different ranges of wavelengths than the associated multilevel metasurfaces of others of the waveguides.

6. The display system of claim 1, wherein each protrusion and space between an immediately neighboring protrusions define a total width of 10-600 nm.

7. The display system of claim 1, wherein the second optically transmissive material forms spaced apart plateaus over the protrusions.

8. The display system of claim 1, wherein the first and second optically transmissive materials are amorphous.

9. A display system comprising:
   a waveguide;
   a light incoupling optical element disposed on a surface of the waveguide and configured to incouple light into the waveguide, the light incoupling optical element comprising:
      a multilevel metasurface comprising:
         a plurality of spaced apart protrusions having a pitch and formed of a first optically transmissive material; and
         a second optically transmissive material over and between the spaced apart protrusions,
   wherein the waveguide is one of a stack of waveguides, wherein each of the stack of waveguides comprises an associated multilevel metasurface,
   wherein the second optically transmissive material has a higher refractive index than either the first optically transmissive material or material forming the waveguide.

10. The display system of claim 9, wherein the second optically transmissive material has a refractive index greater than 1.7.

11. The display system of claim 9, wherein the second optically transmissive material comprises a semiconductor.

12. The display system of claim 11, wherein the second optically transmissive material comprises silicon.

13. The display system of claim 12, wherein the second optically transmissive material comprises silicon nitride or silicon carbide.

14. The display system of claim 9, wherein the second optically transmissive material comprises an oxide.

15. The display system of claim 9, wherein the second optically transmissive material comprises a metal oxide.

16. The display system of claim 15, wherein the second optically transmissive material comprises titanium oxide, zirconium oxide, or zinc oxide.

17. The display system of claim 1, wherein the metasurface is a bi-level metasurface.

18. The display system of claim 1, wherein the metasurface is a tri-level or higher level metasurface.

19. A display system comprising:
   a waveguide;
   a light incoupling optical element disposed on a surface of the waveguide and configured to incouple light into the waveguide, the light incoupling optical element comprising:

a multilevel metasurface comprising:
  a plurality of spaced apart protrusions having a pitch and formed of a first optically transmissive material; and
  a second optically transmissive material over and between the spaced apart protrusions,
wherein the waveguide is one of a stack of waveguides, wherein each of the stack of waveguides comprises an associated multilevel metasurface,
wherein the second optically transmissive material has a higher refractive index than both the first optically transmissive material and the material forming the waveguide,
wherein the first optically transmissive material has a lower refractive index than the material forming the waveguide.

20. The display system of claim 19, wherein the pitch of the protrusions varies across the surface of the waveguide.

21. The display system of claim 19, further comprising an image injection device configured to inject light comprising image information into the waveguide.

22. The display system of claim 19, wherein the waveguide is one of a stack of waveguides, wherein each of the stack of waveguides comprises an associated multilevel metasurface.

23. The display system of claim 22, wherein the associated multilevel metasurfaces of at least some of the waveguides are configured to redirect light of different ranges of wavelengths than the associated multilevel metasurfaces of others of the waveguides.

24. The display system of claim 19, further comprising a light incoupling optical element disposed on a surface of the waveguide, wherein both of the light incoupling and light outcoupling optical elements comprise a multilevel metasurface.

25. The display system of claim 19, wherein each protrusion and a space between an immediately neighboring protrusions define a total width of 200-500 nm.

26. The display system of claim 19, wherein the second optically transmissive material forms the spaced apart plateaus over the protrusions.

27. The display system of claim 19, wherein the first and second optically transmissive materials are amorphous.

28. The display system of claim 19, wherein the first optically transmissive material is a nanoimprint resist.

29. The display system of claim 19, wherein the second optically transmissive material has a refractive index greater than 1.7.

30. The display system of claim 29, wherein the second optically transmissive material comprises a semiconductor.

31. The display system of claim 30, wherein the second optically transmissive material comprises silicon.

32. The display system of claim 31, wherein the second optically transmissive material comprises silicon nitride or silicon carbide.

33. The display system of claim 29, wherein the second optically transmissive material comprises an oxide.

34. The display system of claim 33, wherein the second optically transmissive material comprises a metal oxide.

35. The display system of claim 34, wherein the second optically transmissive material comprises titanium oxide, zirconium oxide, or zinc oxide.

36. The display system of claim 19, wherein the waveguide is formed of a material having a refractive index of 1.6 or higher.

37. The display system of claim 19, wherein the protrusions are single level structures.

38. The display system of claim 19, wherein the protrusions are stepped, multi-level structures.

39. The display system of claim 1, an image injection device configured to inject light comprising image information into the waveguide, wherein the image injection device is an output end of a scanning fiber display system.

* * * * *